United States Patent [19]

Hogan et al.

[11] 3,996,585
[45] Dec. 7, 1976

[54] VIDEO GENERATOR CIRCUIT FOR A DYNAMIC DIGITAL TELEVISION DISPLAY

[75] Inventors: Walter John Hogan, Fairfax, Va.; Alfred Alexander Schwartz, Gaithersburg, Md.

[73] Assignee: International Business Machines Corporation, Armonk, N.Y.

[22] Filed: Jan. 22, 1976

[21] Appl. No.: 653,997

Related U.S. Application Data

[63] Continuation-in-part of Ser. No. 478,816, June 11, 1974, abandoned.

[52] U.S. Cl. .................... 340/324 AD; 340/172.5
[51] Int. Cl.[2] ........................................ G06F 3/14
[58] Field of Search ............................ 340/324 AD

[56] References Cited
UNITED STATES PATENTS

| | | | |
|---|---|---|---|
| 3,388,391 | 6/1968 | Clark | 340/324 AD |
| 3,599,178 | 8/1971 | Jackson et al. | 340/324 AD |
| 3,675,232 | 7/1972 | Strout | 340/324 AD |
| 3,696,392 | 10/1972 | Fossum et al. | 340/324 AD |
| 3,701,988 | 10/1972 | Allaart | 340/324 AD |
| 3,725,723 | 4/1973 | Colston et al. | 340/324 AD |
| 3,750,135 | 7/1973 | Carey et al. | 340/324 AD |
| 3,771,155 | 11/1973 | Hayashi et al. | 340/324 AD |
| 3,787,833 | 1/1974 | Rogers | 340/324 AD |
| 3,849,773 | 11/1974 | Katahira et al. | 340/324 AD |
| 3,893,075 | 7/1975 | Orban et al. | 340/324 AD |

Primary Examiner—David L. Trafton
Attorney, Agent, or Firm—John E. Hoel

[57] ABSTRACT

A video generator is disclosed for use in a digital television display system, for converting randomly occurring data signals representing graphical patterns into a time-sequential video signal for use with a sequentially line scanned display device. The circuit is comprised of a threaded buffer connected to receive the data signals and adapted to sort the data signals into groups ordered by extremal scan line positions for the pattern represented. An intermediate buffer has a first input connected to the output of the threaded refresh buffer for storing the ordered data signals once during each display field before the display of the pattern represented and outputting the ordered data signals in synchronism with the line scans of the display. A graphical pattern generator is connected to the output of the intermediate buffer for decoding the ordered data signals outputted therefrom and generating on a first output line components of the pattern represented which lie along the display line to be scanned. A partial raster assembly storage is connected to the first output line from the graphical pattern generator, to store the components of the pattern represented which lie along the display line to be scanned. The graphical pattern generator modifies the decoded ordered data signals to identify the horizontal coordinate for the intersection of the pattern represented with the next display line to be scanned, and outputs the modified data signal over a second output line to a second input line for storage in the intermediate buffer. The graphical pattern generator omits the output of a modified data signal on the second output line when no components of the pattern will intersect succeeding display lines to be scanned in the field.

20 Claims, 22 Drawing Figures

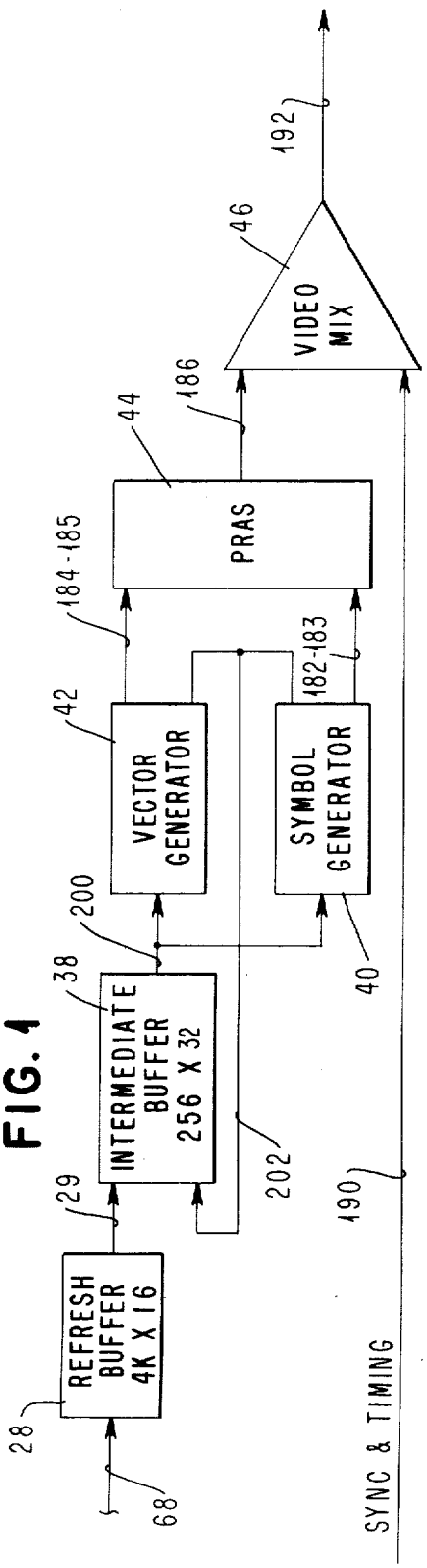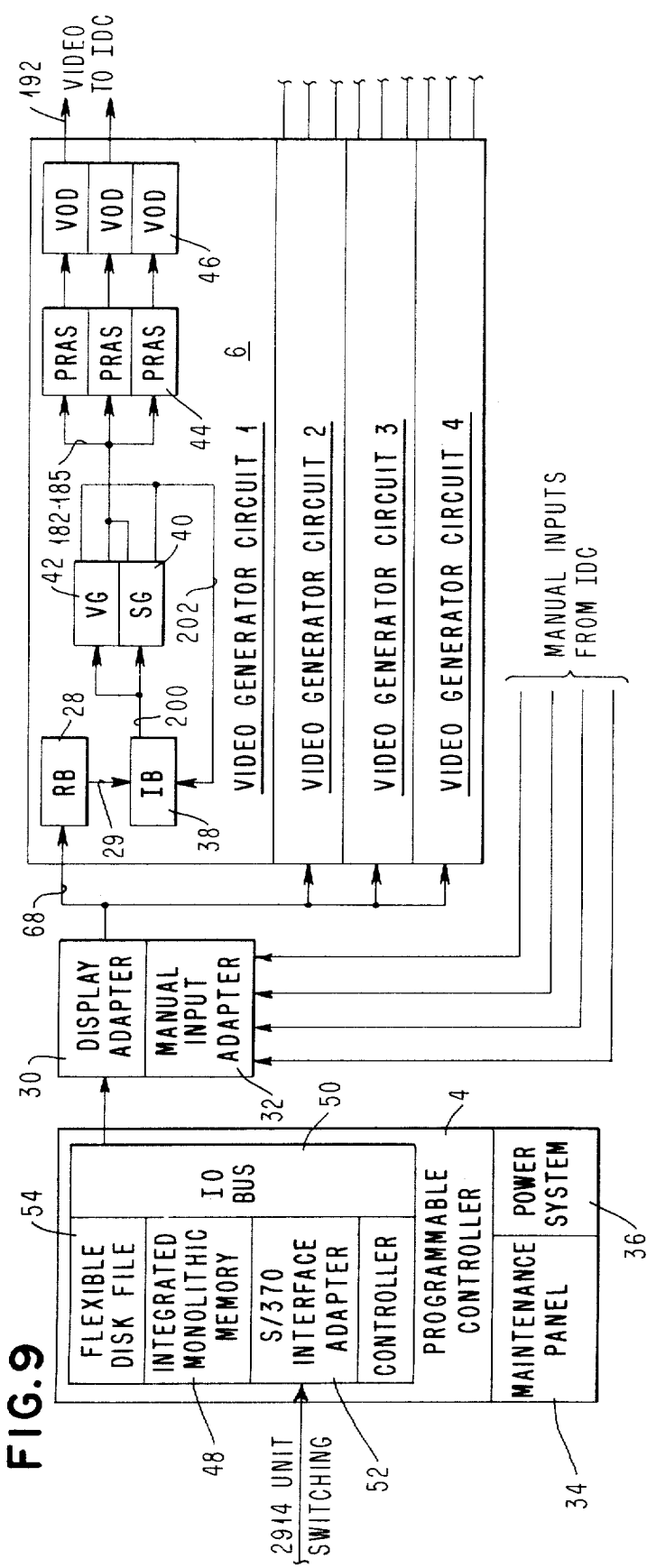

FIG. 2
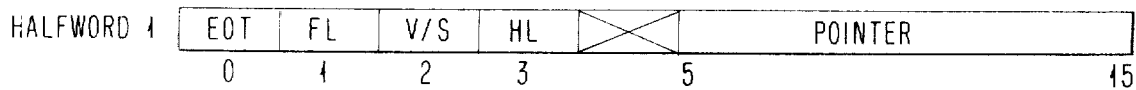
HALFWORD 1: EOT | FL | V/S | HL | ☒ | POINTER
0  1  2  3  5  15
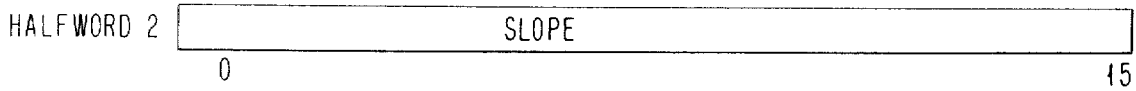
HALFWORD 2: SLOPE
0  15
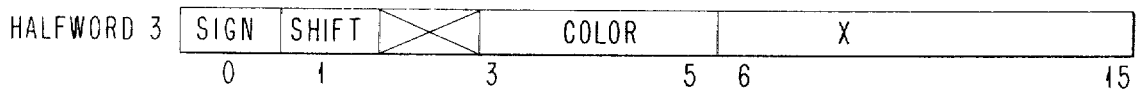
HALFWORD 3: SIGN | SHIFT | ☒ | COLOR | X
0  1  3  5 6  15
HALFWORD 4: ☒ | ΔY
0  6  15
VECTOR FORMAT
HALFWORD 1: EOT | FL | V/S | HI ORD SPACE | POINTER
0  1  2  3  4 5  15
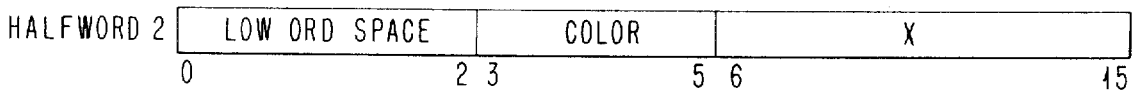
HALFWORD 2: LOW ORD SPACE | COLOR | X
0  2 3  5 6  15
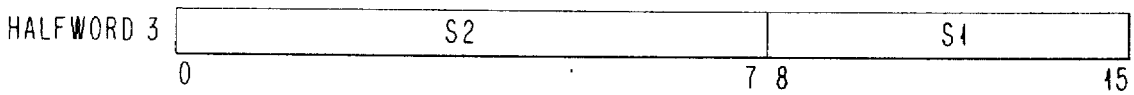
HALFWORD 3: S2 | S1
0  7 8  15
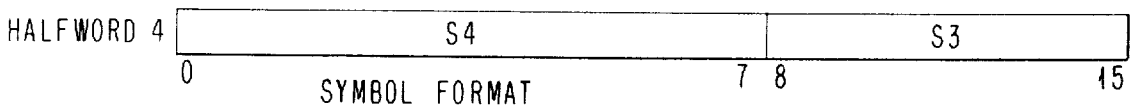
HALFWORD 4: S4 | S3
0  7 8  15
SYMBOL FORMAT
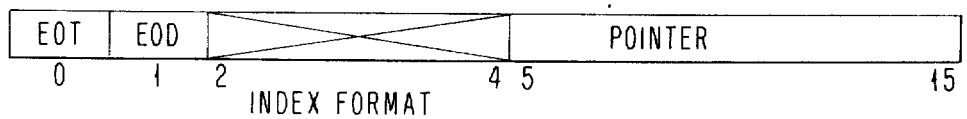
EOT | EOD | ☒ | POINTER
0  1  2  4 5  15
INDEX FORMAT
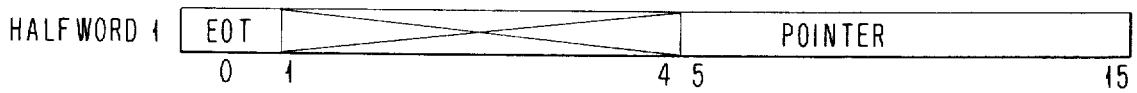
HALFWORD 1: EOT | ☒ | POINTER
0  1  4 5  15
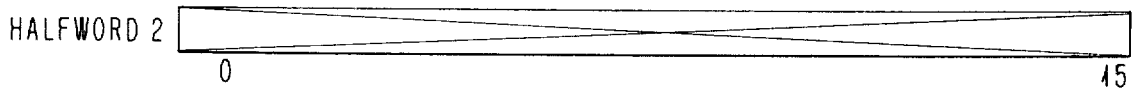
HALFWORD 2:
0  15
HALFWORD 3:
0  15
HALFWORD 4:
0  15
EMPTY SLOT FORMAT

FIG. 11

| SLOT NUMBER | EOT BIT | POINTER FIELD | DATA |
|---|---|---|---|
| 1 | 0 | 8 | |
| 2 | 0 | 11 | |
| 3 | 0 | 6 | |
| 4 | 0 | 7 | |
| 5 | 1 | | |
| 6 | 0 | 5 | |
| 7 | 0 | 2 | |
| 8 | 0 | 9 | |
| 9 | 0 | 3 | |
| 10 | 0 | 1 | |
| 11 | 0 | 10 | |

FIG. 12

| SLOT NUMBER | EOT BIT | POINTER FIELD | DATA |
|---|---|---|---|
| 1 | 0 | 8 | |
| 2 | 0 | 11 | |
| 3 | 0 | 6 | |
| 4 | 0 | 7 | |
| 5 | 1 | | |
| 6 | 0 | 5 | |
| 7 | 0 | 2 | |
| 8 | 0 | 9 | |
| 9 | 0 | 3 | |
| 10 | 0 | 1 | |
| 11 | 0 | 10 | |
| 12 | 0 | 4 | |

| SCAN LINE | CALCULATION | INTENSIFIED ELEMENTS |
|---|---|---|
| 50 | 50 + 1.25 = 51.25 | 50,51 |
| 49 | 51.25 + 2.50 = 53.75 | 52,53 |
| 48 | 53.75 + 2.50 = 56.25 | 54,55,56 |
| 47 | 56.25 + 2.50 = 58.75 | 57,58 |
| 46 | 58.75 + 2.50 = 61.25 | 59,60,61 |
| 45 | 61.25 + 2.50 = 63.75 | 62,63 |
| 44 | 63.75 + 2.50 = 66.25 | 64,65,66 |
| 43 | 66.25 + 2.50 = 68.75 | 67,68 |
| 42 | 68.75 + 1.25 = 70.00 | 69,70 |

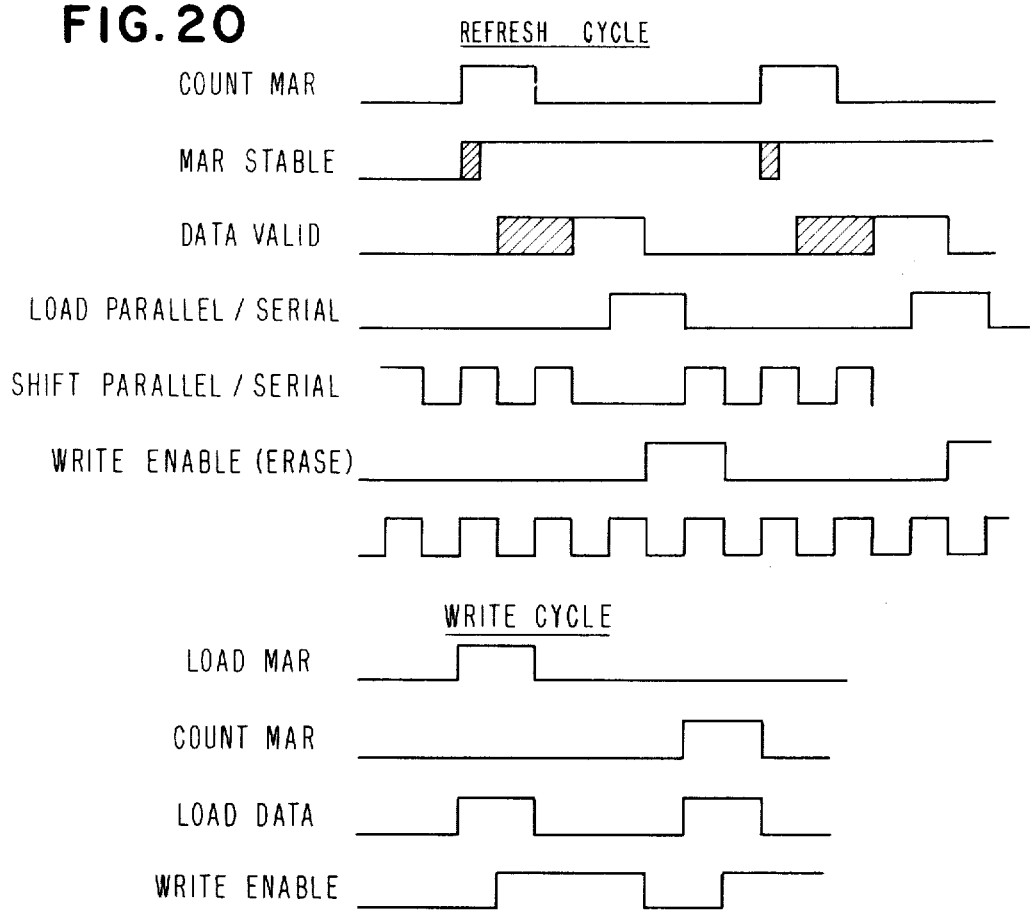
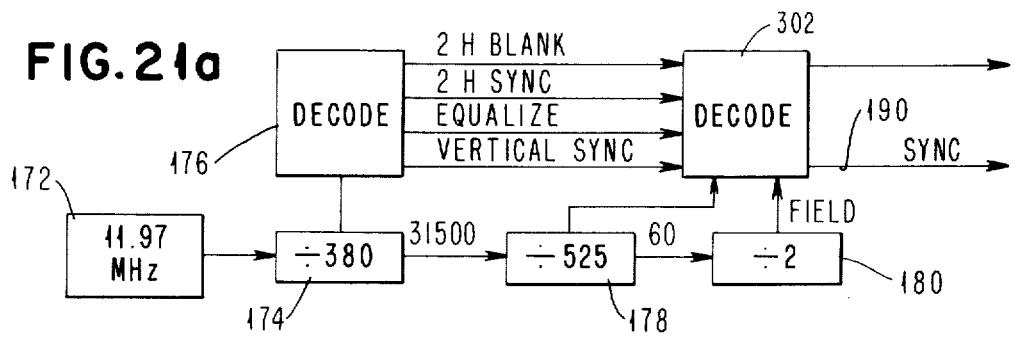
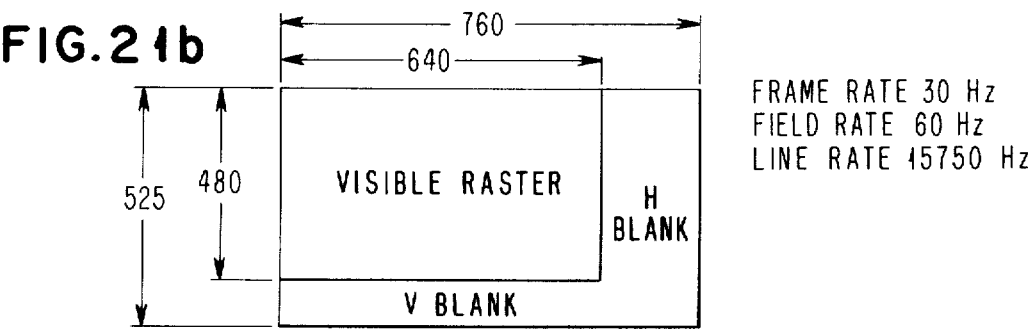

VIDEO GENERATOR CIRCUIT FOR A DYNAMIC DIGITAL TELEVISION DISPLAY

This is a continuation-in-part of U.S. pat. application Ser. No. 478,816, filed June 11, 1974, now abandoned.

FIELD OF THE INVENTION

The invention disclosed herein relates to data processing devices and more particularly relates to digital television display systems.

BACKGROUND OF THE INVENTION

Digital television display systems in the prior art produced line drawings by storing one video bit for every element of the picture. In many such prior art systems the raster assembly storage would have to store as many as one million video bits for a 1024 X 1024 raster matrix. The completed picture would then be transferred to a refresh store. One substantial drawback in such prior art displays is that any alteration in the displayed picture would require either the generation of a new picture or the moving of all one million bits to the raster assembly storage for modification and return. Thus to effect a single erasure of a single vector would require either the reassembly of the entire raster or the transfer of the entire one million bits out of the storage for alteration and replacement. In the event that two vectors cross one another, the process of erasing a first vector, after transfer back to the assembly store, would remove video bits common to both vectors, leaving the remaining vector with a gap separating the components on either side of the erased vector.

Some progress has been made in the prior art through the implementation of queue memories for the storage of digitally encoded video data. One example of such a prior art system discloses a video generator for data display which employs a threaded refresh buffer. The use of such a buffer permits a reduction in the size of the raster assembly storage over that of the prior art. However, this prior art image buffer must be large enough to accommodate the tallest character which is intended to be displayed. According to prior art teachings this would be at least eight raster lines which must be stored in the video image buffer. The prior art states that if a vector were to exceed the vertical height of such a video image buffer, it would have to be generated as separate segments. This, it is disclosed, would be accomplished by returning the contents of vector registers in the vector generator to the threaded list of the data buffer in order that the vector generator may continue at a later time in the scanning sequence. It is seen that the amount of processing necessary to access the next component of the vector in the next group of raster lines to be scanned, by accessing the threaded buffer itself, reduces the display capability of the system and increases its complexity.

What the art requires is an improved means of accessing subsequent components of vectors and other data stored in the system so as to enable higher rates for display.

OBJECTS OF THE INVENTION

It is an object of the invention to store graphic and alphanumeric display data so as to be more efficiently accessed than has been capable in the prior art.

It is another object of the invention to store graphic display data so as to retain its identity and special attributes such as color, intensity or blink, in an improved manner.

It is still another object of the invention to display decomposed graphics as vector segments in an improved manner.

It is still a further object of the invention to store graphic display words loaded in a random sequence, so as to be sorted into threaded queues of sequential raster line location, in an improved manner.

It is still a further object of the invention to cyclically store display data which is continually modified as the raster field is generated.

SUMMARY OF THE INVENTION

A video generator circuit is disclosed for converting randomly occurring data signals representing graphical patterns into a time sequential video signal for use with a sequential line scan display device. The improvement of the invention includes a threaded buffer connected to receive the data signals and adapted to sort the data signals into groups ordered by extremal scan line positions for the pattern represented. An intermediate buffer having a first input connected to the output of the threaded refresh buffer, stores the ordered data signals once during each display field before the display of the pattern represented. The intermediate buffer outputs the ordered data signals in synchronism with the line scans of the display. A graphical or alphanumeric pattern generator is connected to the output of the intermediate buffer for decoding the ordered data signals outputted from the intermediate buffer. The graphical pattern generator generates on a first output line, components of the pattern to be represented which lie along the display line or group of lines to be scanned. A partial raster assembly storage is connected to the first output line from the graphical or alphanumeric pattern generator to store the components of the pattern represented which lie along the display line or lines to be scanned. The graphical pattern generator modifies the decoded, ordered data signals to identify the horizontal coordinates for the intersection of the pattern represented with the next display line or lines scanned. The graphical or alphanumeric pattern generator also modifies control data and outputs the modified data signals over a second output line to a second input line in said intermediate buffer for storage. The graphical or alphanumeric pattern generator omits the output of a modified data signal on the second output line when no components of the pattern will intersect succeeding display lines to be scanned in the field. The intermediate buffer has a novel memory structure organized into a preload area and an active area. In operation, the video circuit generator invention reduces the amount of processing necessary to dynamically generate a DTV display.

DESCRIPTION OF THE DRAWINGS

The foregoing and other objects, features, and advantages of the invention will be apparent from the following more particular description of the preferred embodiment of the invention, as illustrated in the accompanying drawings.

FIG. 1 depicts the video generator circuit invention.

FIG. 2 shows the data word format input to the refresh buffer 28.

FIG. 9 is a block diagram of a graphic display control unit 8.

FIG. 11 shows a threaded list in the refresh buffer for a first loading.

FIG. 12 shows a threaded list in the refresh buffer for a second loading configuration.

FIG. 20 gives a detailed illustration of the timing for the refresh cycle in the PRAS.

FIG. 21a shows the SYNC generator block diagram and FIG. 21b, the resulting raster.

DISCUSSION OF THE PREFERRED EMBODIMENT

Figure 13:
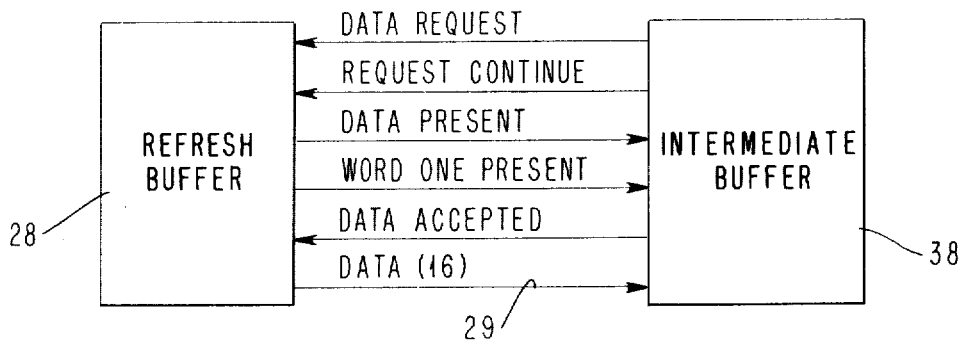
FIG. 13 shows the refresh buffer-intermediate buffer interface.

The dynamic digital TV display technique can be generally described as follows. Digital TV is a display technology which takes coded data from a computer source and converts it to a TV video signal. This signal drives one or more TV monitors which present the desired computer display picture. The logic which converts the coded computer data to a TV signal is all digital, the same as that used in a computer. Thus, digital TV has succeeded in using the technical advances developed in both the TV and computer industries to provide a unique computer display capability.

A TV display in the context used here is one in which the electron beams (one for each primary color) are repeatedly deflected across the face of the Cathode Ray Tube (CRT) in a series of closely spaced parallel lines (called a raster). This is repeated a fixed number of times each second (refresh rate). Within a particular display system the number of parallel lines and the refresh rate are usually fixed. A typical display has 525 lines and is refreshed 30 times per second. Each frame is divided into two fields. One field consists of the odd numbered scan lines and the other the even scan lines; this results in an interlaced scan which produces an apparant doubling of the refresh rate.

Digital TV presents a computer display in a TV format by reducing the image to a matrix of points or display elements. In a display with horizontal scan lines, the number of vertical display elements is equal to the number of visible scan lines. The number of elements within each scan line is somewhat arbitrary but is chosen to be 1.33 times the number of scan lines. This conforms to the 4:3 aspect ratio of the TV Cathode Ray Tube. Even though the image is made up of elements, it appears continuous because of the large number of elements used.

The invention disclosed herein makes use of the new technique of graphic generation known as "on-the-fly" or "implicit refresh". This is to be contrasted from the "explicit refresh" found in older DTV Systems. The on-the-fly technique permits all displayable data to retain its identity in computer coded form up the the final stages of video generation.

In use, implicit refresh allows for erasing data on the display without erasing overlaying (intersecting) data. It permits selective modification of the data. This method of display generation is particularly attractive when blink (flash) and color are desired. The attribute bits for indentification or color and flash are contained in computer coded form.

In terms of hardware, implicit refresh can reduce the storage requirements in memory by a factor of 18 to 1 for a color graphic display.

The video generator circuit invention shown in FIG. 1, makes use of the "on-the-fly" refresh technique to dynamically generate a digital television display. The video generator circuit is composed of the refresh buffer 28, the intermediate buffer 38, the vector generator 42 or symbol generator 40, and the partial raster assemly store 44.

Figure 3:
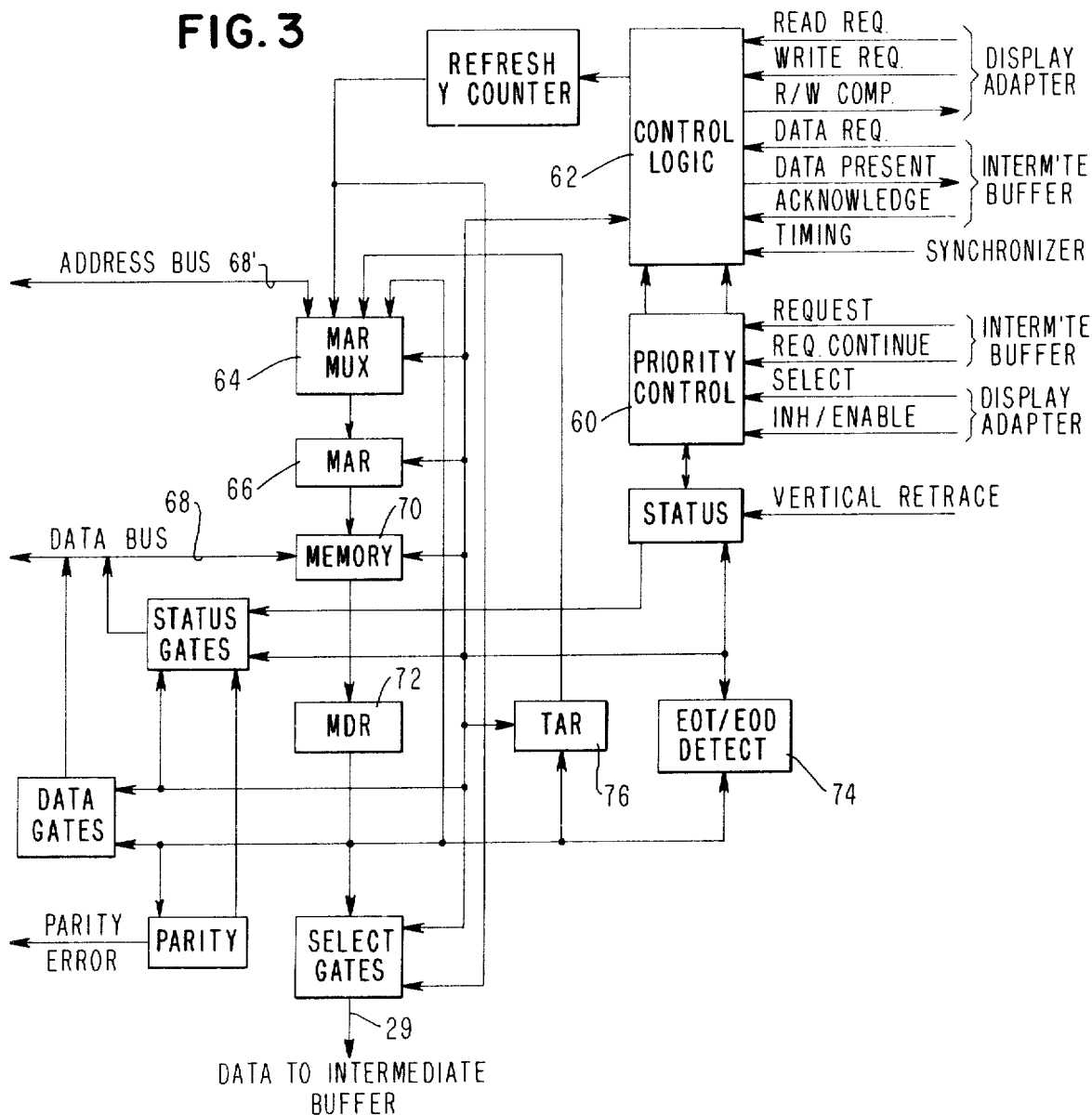
FIG. 3 shows a detailed block diagram of the refresh buffer 28.

The refresh buffer 28 accepts data signals representing picture elements, in a format such as is shown in FIG. 2 from a data source such as a computer or programmable controller. The refresh buffer 38 reads the data words out, ordered by Y-address, once per field to the vectors and symbols organized as background and dynamic data. The refresh buffer 28 consists of a control module and two storage modules providing a total of 8K halfwords, each with sixteen data and two parity bits. The major function of the refresh buffer 28 is to store the coded data for constructing the visual display. Data, which is received from the digital computer over line 68 in random fashion, is stored in a form ordered by Y-line. This allows the refresh buffer 28 to be read on a line-by-line basis. A detailed block diagram of the refresh buffer is shown in FIG. 3.

The data word formats, shown in FIG. 2 consist of the Vector Format, the Symbol Format, the Index Format, and the Empty Slot Format. Vectors require a four halfword slot per vector. Symbols require a four halfword slot per set of up to four sequential symbols. Single symbols also require the same size slot, with space code for the last three symbols. The meaning of the fields is discussed later. Data words are transferred from the digital computer to the refresh buffer 28 on a shared bi-directional halfword bus 68.

Figure 4:
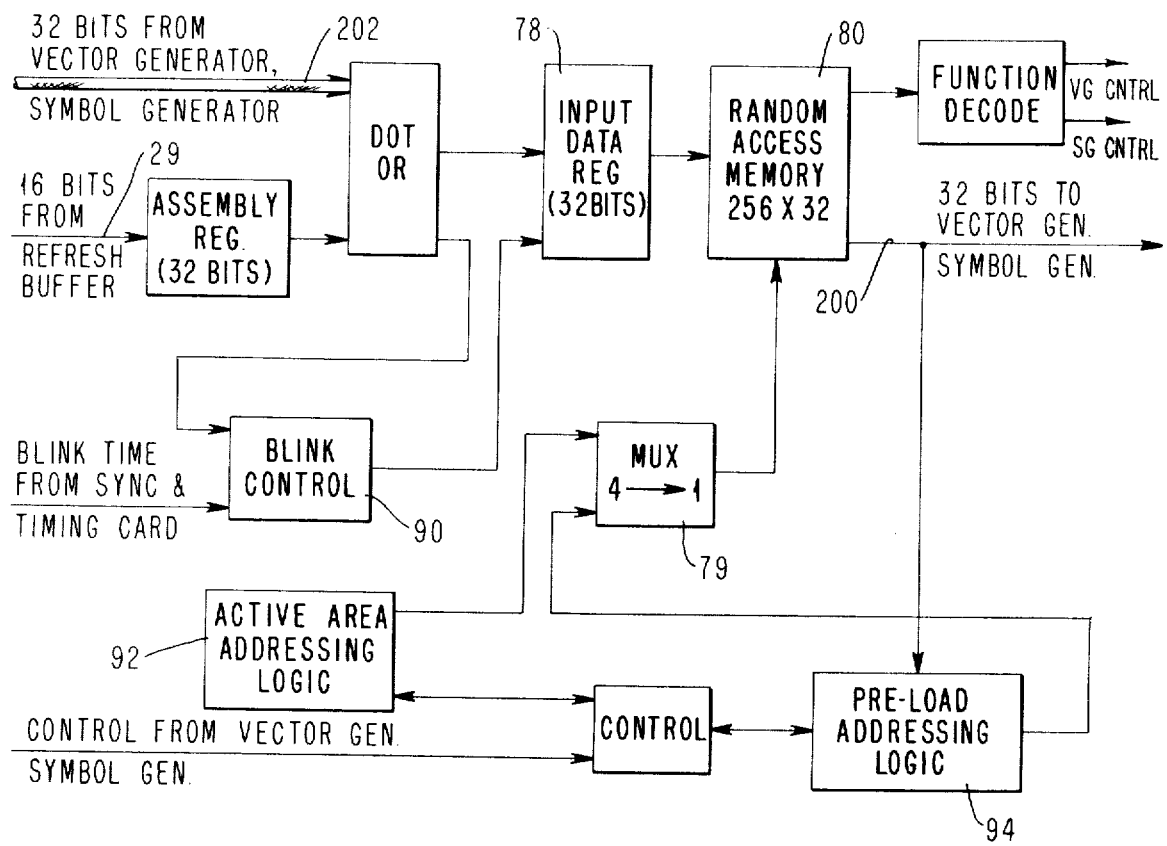
FIG. 4 shows a detailed block diagram of the intermediate buffer 38.

The intermediate buffer 38 is a small, high-speed, memory, which receives data in coded form from the refresh buffer 28, and transmits the data, in turn to the symbol 40 or vector generator 42, as required. The intermediate buffer 38 receives, from the refresh buffer 28 two 32-bit words for each symbol or vector starting on a raster line. This data is requested by the IB 38, as memory space becomes available, prior to the time the raster line is transmitted to the display 10. A detailed block diagram of the intermediate buffer is shown in FIG. 4.

Each pair of coded data words is transmitted, at high speed, to the appropriate display generator (symbol 40 or vector 42) where it is converted into digital video data. Since a vector or symbol may appear on several raster lines, the symbol 40 or vector 42 generator modifies the coded data word, and then rewrites it into the intermediate buffer 38, for use in generating the digital video data for the next raster line. If the video data conversion has been completed during the generation of the current raster line, that particular data word is not re-written into the intermediate buffer 38.

The intermediate buffer 38 is organized into a preload area and an active area, with a total capacity of 256 32-bit words. Data words are transferred from the refresh buffer 28 to the preload area as room becomes available, and from the preload area to the active area as required for display.

Figure 5:
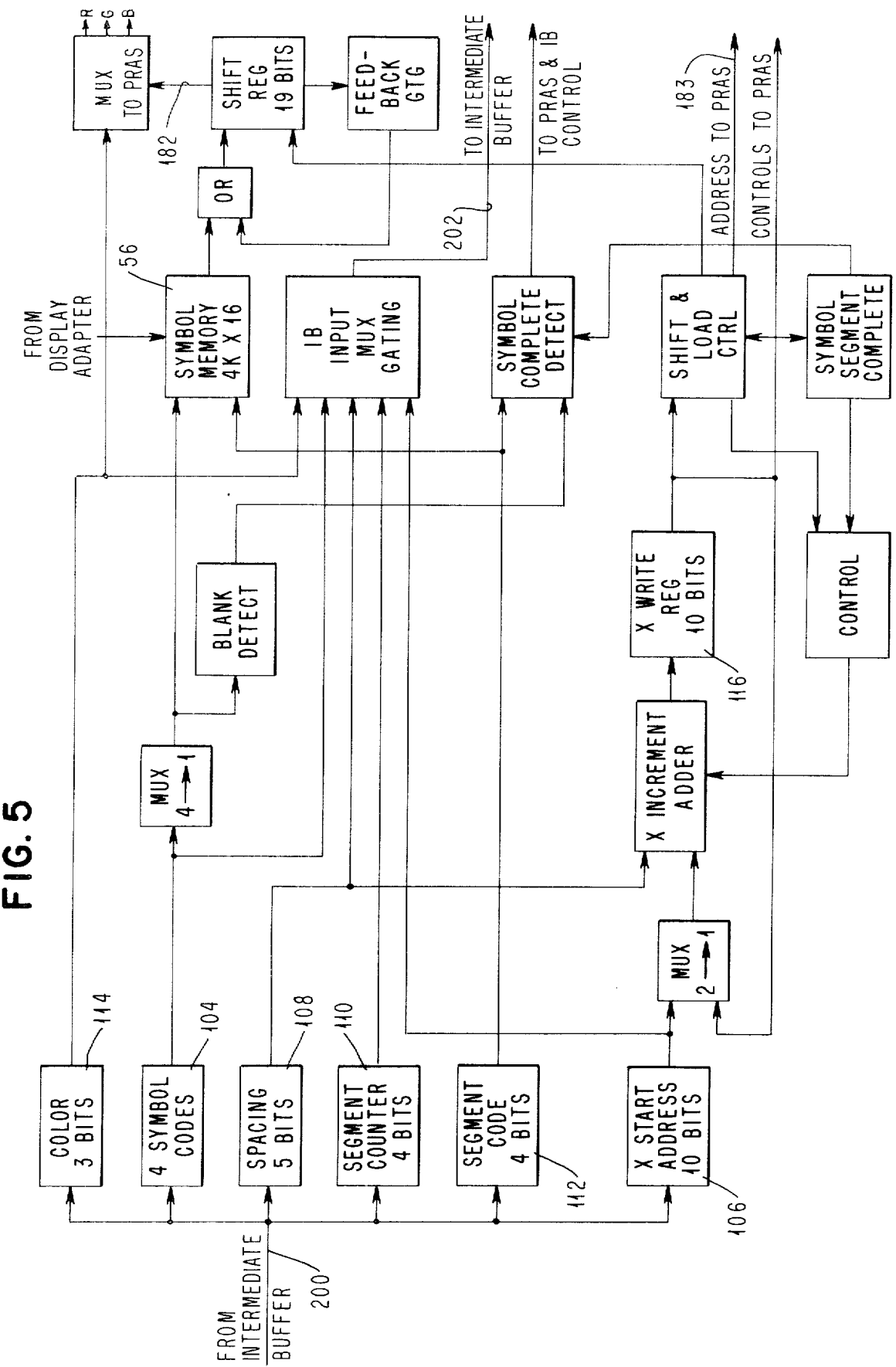
FIG. 5 is a block diagram of the symbol generator 40.

The symbol generator 40 utilizes a programmable memory to convert coded symbol data from the intermediate buffer 38 into appropriate symbol bit patterns for the raster line to be displayed. The symbol memory 56 is loaded from the host processor. Capacity for up to 256 symbols can be provided. The symbol memory can store any dot matrix pattern within a 16-by-16 format. A detailed block diagram of the symbol generator is shown in FIG. 5.

Each pair of words from the intermediate buffer 38 provides up to four symbol codes. The symbol generator 40 automatically spaces and positions the symbol in accordance with a space code field in the first word. Spacing between symbols is specified by the host processor.

The symbol generator 40 decrements a counter field in the intermediate buffer word pair before causing the data words to be re-written in the intermediate buffer 38. When the count is zero, the words are purged from the intermediate buffer 38.

Figure 6:
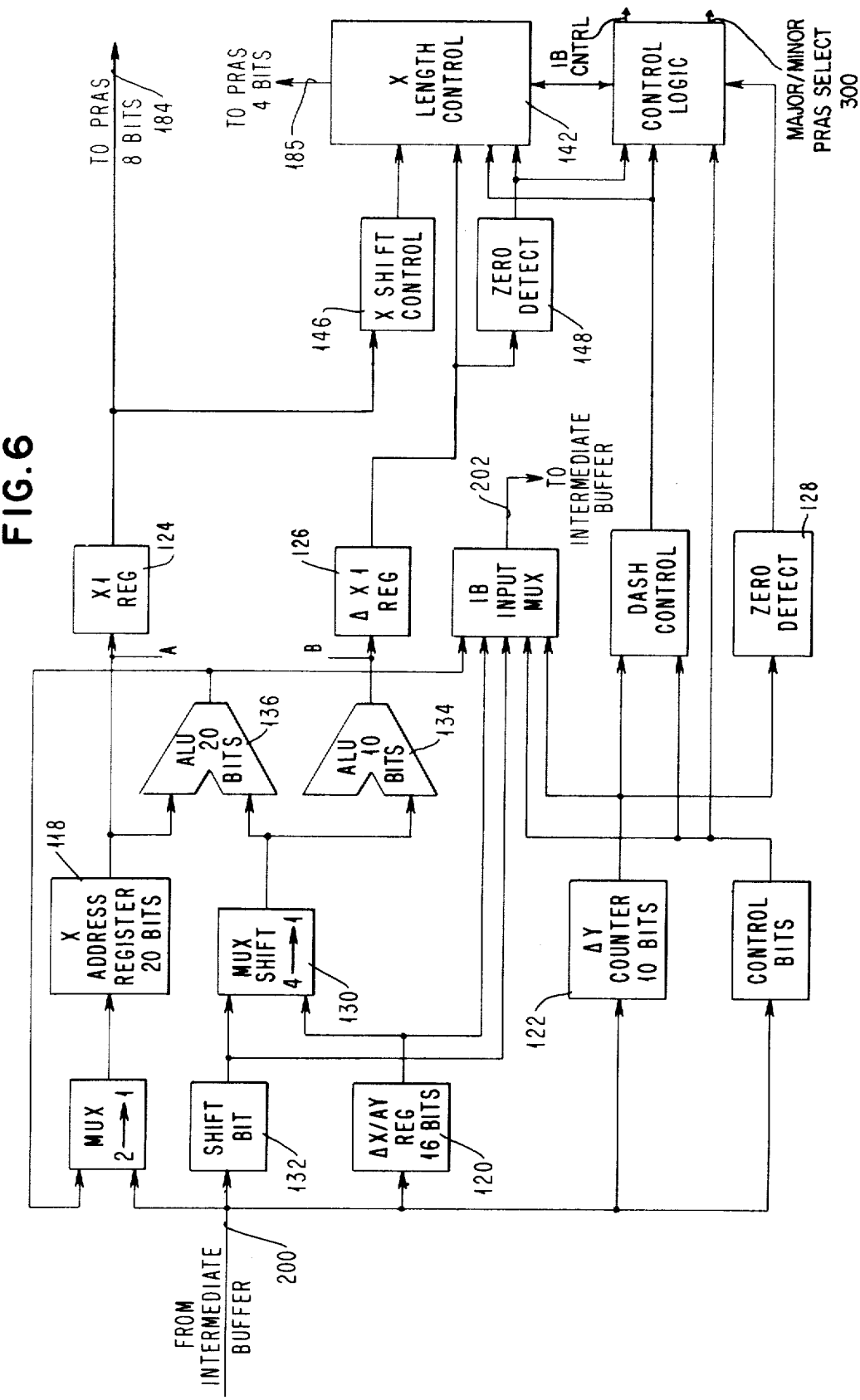
FIG. 6 is a detail block diagram of the vector generator 42.

The vector generator 42 accepts two data words from the intermediate buffer 38 and uses them to determine which elements on each display line comprise the vector. All vectors are specified by the host processor as individual vectors starting at the top and running downward on the screen. A detailed block diagram of the vector generator is shown in FIG. 6.

Vectors are expressed as X and Y positions, inverse slope ($\Delta X/\Delta Y$), and number of Y lines on which the vector appears (Y length). The XY coordinate origin is the lower left corner of the display, with positive X from left to right, and positive Y from bottom to top. The vector generator 42 uses the inverse slope to determine the number of elements on the current line, and updates the X position for use on the next line. It counts down the number of Y lines to determine the vector end. The use of a modified floating point technique insures that every point on a vector will be within one display element of the theoretical line specified by the host processor.

Figure 7:
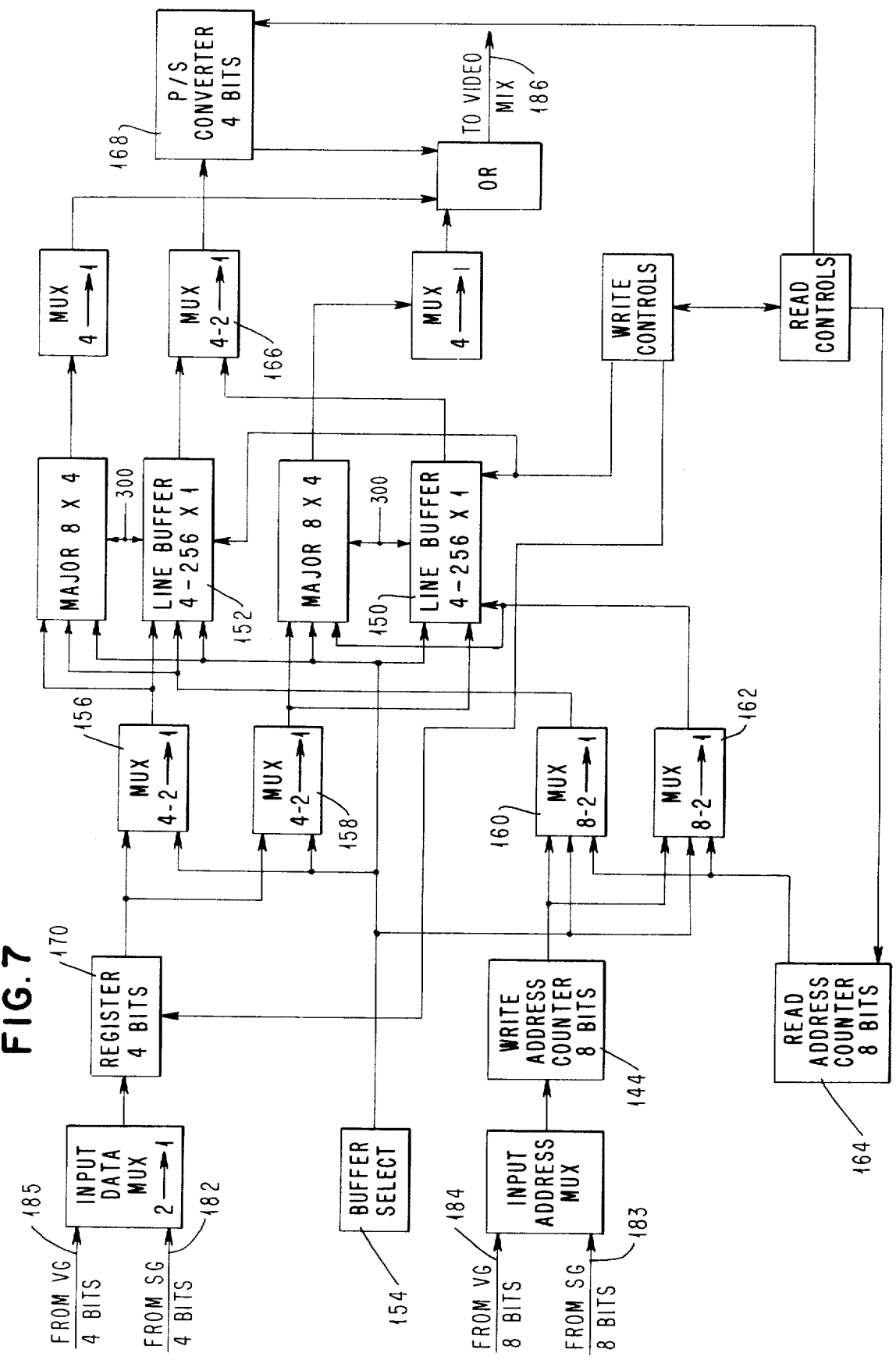
FIG. 7 is a block diagram of the partial raster assembly store 44.

The partial raster assembly store 44 (PRAS) is a high-speed memory with capacity for two full display raster lines in explicit (noncoded video dot pattern) form. All vector and symbol dot pattern data are assembled in one line of the PRAS 44 during the line time preceding its normal display presentation. When the video line is to be displayed, the PRAS line is read out at video rate while the next line is being assembled in the second PRAS line. A detailed block diagram of the PRAS is shown in FIG. 7.

The use of a PRAS 44 greatly simplifies the vector 42 and symbol 40 generators, eliminates restrictions on digital video data intersections, and removes any need for ordering display data by X position in the IB 38 or RB 28. The vector 42 and symbol 40 generators can drive three PRAS's 44, one for each of the primary colors required to drive a RGB color display monitor 10.

The digital video output signal from each PRAS 44 is routed to a video output driver 46, where it is mixed with sync signals, and converted to a composite video signal for transmission over line 192 to the DTV display. One output driver 46 is required for each primary color.

THE SYSTEM CONTEXT

The DDTV System Context

Figure 8:
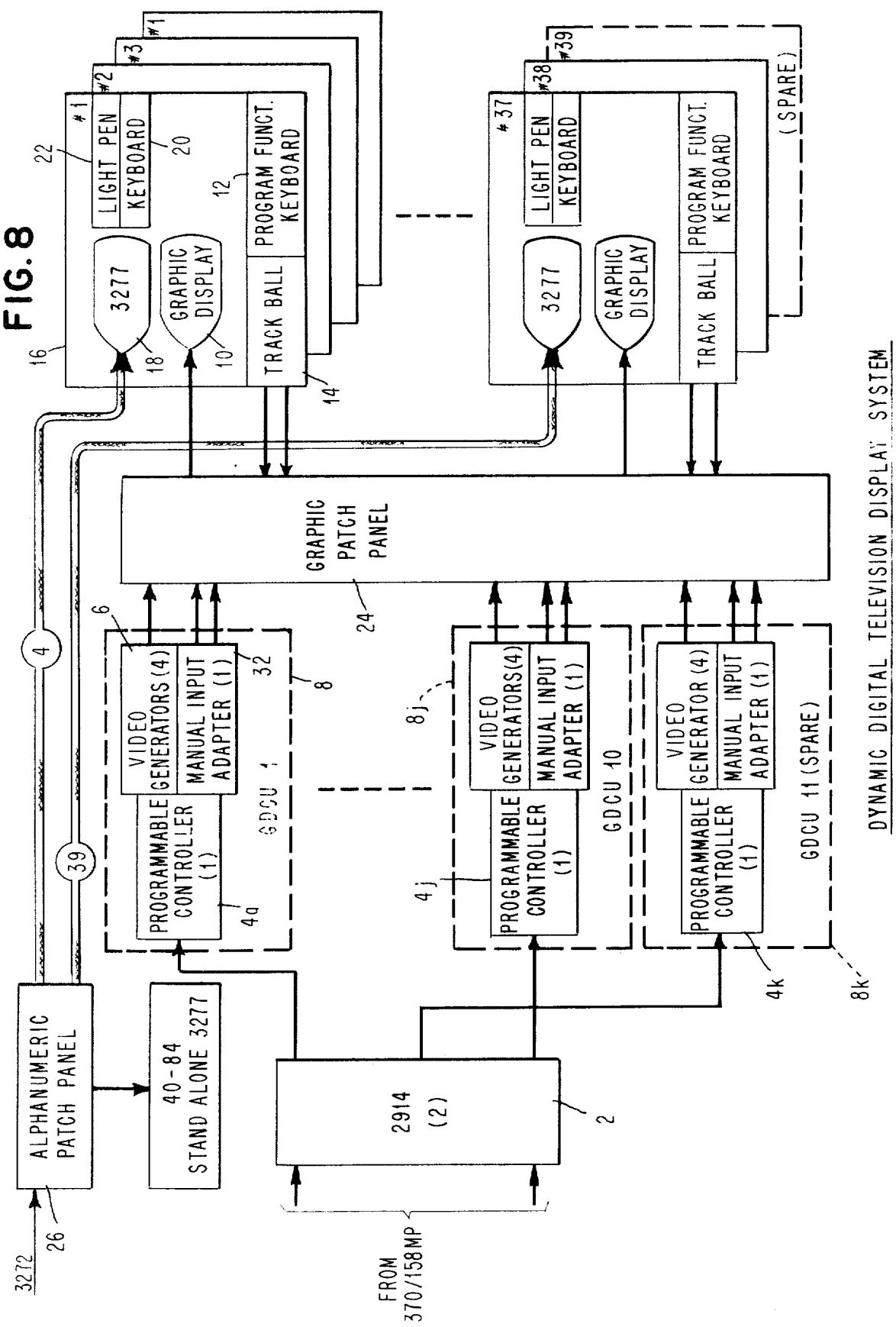
FIG. 8 depicts a system block diagram of a dynamic digital television display system.

The operation of the video circuit generator invention can best be described in the context of its use in a dynamic digital television system such as is shown in FIG. 8, for use in applications where rapid and accurate identification of information is of prime importance.

An example is given of a particular dynamic digital television (DDTV) system which employs the video generator circuit invention. The disclosure of this DDTV system for utilizing the video generator circuit invention should not be construed as limiting the applicability of the invention to other display system applications. The example DDTV system is composed of customized hardware which furnishes situation display presentations, in color, to a plurality of independent operators, each at his own integrated display console where he can interact with the host computer via trackball and program function keyboard devices. The DDTV uses a plurality of on-line graphic display control units to convert computer data into randomly positioned vectors and symbols which may be representative of dynamic situations; background graphics with annotation may be simultaneously generated to support the application.

Novel digital television techniques are utilized to generate the graphic display presentations. These techniques implemented with the disclosed hardware to provide the desirable characteristics of flexible configuration, high availability, autonomous refresh (refresh not in host computer), independent operation of a plurality of integrated display consoles, small cluster configuration (4 consoles per graphic display control unit), off-line, on-line and in-line operability and maintainability via programmable controller, disk, and support software, solid state design using monolithic and integrated circuit techniques and IBM system/370 compatibility.

Among the graphic display features of the system are 307,200 displayable elements on a 480 vertical by 640 horizontal format, color presentations in 7 colors plus black, constant refresh rate of 30 frames per second, total display update in less than one second, up to 1700 vectors or 1700 random symbols per display, selective update of dynamic and background data, programmable character set of 255 symbols per display (16 X 16 element matrix), full vector graphics capability, high relative accuracy, uniform intensity, data retention (no erasing of data intersections), and blink or flash of individual vectors and symbols.

The system is comprised of the following major functional units.

The integrated display console (IDC) 16 houses a color graphic display and operator devices for interacting with the system. An independently operating IBM 3277 alphanumeric display, supported by alphanumeric keyboard and light pen, is integrated into the console structure. IDCs are connected on-line with unit available for backup or test purposes.

The graphic display control unit (GDCU) 8 comprised of a programmable controller for performing data formatting, buffering, operator device handling, and control functions; disk attachment for initial program load and internally generated diagnostic routines; and four independent on-the-fly color graphic/symbol video generators 6. Each video generator 6 contains the video generator circuit invention of FIG. 1, modified by the addition of two additional PRAS 44 and two additional video mixers or drivers 46 to permit three color RGB display. Active GDCUs furnish an on-line capability for independent display channels, with an eleventh GDCU available for backup.

Graphic patch panel (GPP) 24 designed to provide reconfigurability and to enhance graphic system availability. This panel permits any of 44 GDCU color channels (from 11 GDCUs) to be connected manually to any of up to 44 IDCs with associated operator devices.

Alphanumeric patch panel (ANPP) 26 designed to provide reconfigurability and to enhance IBM 3270 alphanumeric system availability. This panel permits any of 84 alphanumeric display channels (from IBM 3272 control units) to be connected manually to any of up to 84 IBM 3277 alphanumeric displays (39 console mounted units and 45 free standing units) with associated operator devices.

A more specific description of the system's apparatus follows. Dynamic digital TV system (DDTV) of FIG. 8 is a versatile, interactive color display system, interfacing with two System/370 Model 158 MP computers through an IBM 2914 Switching Unit 2. The DDTV system employs high speed, monolithic refresh buffers, under the control of a programmable controller 4. The technology is current, using high speed, high density, solid state logic. A programmable controller 4 and as many as four (4) video generators 6 can comprise a graphic display control unit (GDCU) 8.

Each video generator 6 within the GDCU 8 provides the necessary graphic signals and controls to drive a 19-inch, industrial color TV monitor 10 with intertive capability provided by a program function keyboard 12 and a trackball for graphic cursor control 14. The display 10, keyboard 12, and trackball 14 are housed in an integrated display console (IDC) 16 together with an IBM 3277 display station 18, alphanumeric keyboard 20 and light pen 22. The alphanumeric units 18, 20, and 22 while physically part of the IDC 16, are separately controlled by an IBM 3272 control unit and may be considered a separate, stand-alone system.

The DDTV system consists of 10 GDCUs 8 and IDCs 16, with one GDCU 8 and one IDC 16 provided as spares. Each GDCU 8 is capable of driving and controlling 4 IDCs 16. Through the use of a graphic patch panel 24, each GDCU 8 may be connected to any 4 IDCs 16, providing both flexibility and system reliability, through reconfiguration. The 3277 display stations may also be reconfigured through a separate alphanumeric patch panel 26.

A programmable controller 4 feeds data words representing vectors and symbols to be displayed, to this video generator circuit invention contained in the GDCU 8. The video generator circuit employs the graphic/symbol on-the-fly generation technique to create, in color, displays of dynamic (rapid update) graphics and symbols and static backgrounds. The on-the-fly technique improves the performance of the system and eliminates the need for extensive raster assembly and refresh storage commonly associated with DTV systems.

The programmable controller 4 operates with four independent color video generators 6 to service the requirements of four individual display consoles 16. A disk attachment to the programmable controller 4 can provide initial program load (IPS) capability and storage of diagnostic routines and test patterns for exercising, on an individual basis, each color display channel of the cluster. Communication with the host computer (System/ 370) channel and handling of operator-controlled interactive devices are effected via adapters on the programmable controller 4.

The primary data flow paths in the DDTV system are between the host computer system (through the IBM 2914 Switching Unit 2) and the GDCUs 8, and between each GDCU 8 and its cluster of IDCs 16. FIG. 8 illustrates the data flow.

There are two levels of control with the DDTV system: (b 1) graphic commands issued to the GDCU 8 by the host processor across the System/370 I/O interface 2 and (2) internal graphic orders issued by the programmable controller 4 within the GDCU 8 to each of the four associated video generators 6 and their refresh buffers 28. The GDCU 8 shown in FIG. 9 consists of the following functional elements: programmable controller 4, display adapter 30, manual input adapter 32, maintenance panel 34, power system 36, the video generator circuit invention comprising the refresh buffer (RB) 28, the intermediate buffer (IB) 38, the symbol generator (SG) 40, the vector generator (VG) 42, and the partial raster assembly storage (PRAS) 44, and finally the video output from the video generator circuit goes to the video output drivers (VOD) 46.

FIG. 9 is a block diagram of the GDCU 8, and shows how the video generator circuit comprising elements 28, 38, 40, 42, 44 and 46 are replicated four times within each GDCU 8 to control a cluster of up to four IDCs 16. The video generator circuit elements 28, 38, 40, 42, 44 and 46 are described on a per-channel basis. A detailed design description is given later.

The programmable controller 4 (PC) is a stored program processor, incorporating an integrated monolithic memory 48, and an I/O bus 50 for external communication, through appropriate adapters. The PC 4 interfaces with the host computer (an System/370 Model 158 MP) through an System/370 local channel adapter 52, with a disk file 54 through a disk file adapter, and with the GDCU video generators 6 and the IDC's 16 through the display adapter 30.

The control program, loaded into the integrated memory 48 from the disk file 54, allows the controller 4 to receive graphic commands and data from the host computer through the System/370 interface 52. The controller 4 then interprets the graphic commands, manipulates the data as required, and transmits graphic order and data to the applicable video generator 6. Additionally, the controller 4 queues manual inputs from the IDCs 16 and transmits them to the host processor on an interrupt basis.

In an off-line mode, the controller 4 is capable of interpreting manual inputs from the IDCs 16 and controlling the video generators 6 through diagnostic routines stored on the disk file 54. This also allows in-line operation, whereby one IDC 16 in a cluster may be operated off-line in diagnostic mode, without impacting the operation of the other three IDCs 16.

The display adapter 30 allows the programmable controller 4 to provide data and control to four independent video generators 6 on a multiplexed, demand-response basis.

The manual input adapter 32 provides a multiplexed interface between the display adapter 30 and (1) the trackball 14 in each IDC 16 for graphic cursor positioning and (2) the program function keyboard 12 in each IDC 16 for console operator interaction.

The maintenance panel 32 contains controls, switches, and indicators to allow the GDCU 8 to be exercised off-line for diagnostic purposes. Additionally, controls are provided to put a single video generator 6 into an in-line mode whereby it can be exercised in a diagnostic mode independent of the host processor without impacting the operation of the other three display generators 6.

The power system accepts line power to provide the necessary power at required voltages to operate the GDCU 8 and all its components.

The integrated display console 16, contains the following elements: graphic display 10, program function keyboard 12, and trackball 14. The graphic display 10 is standard, industrial 19-inch, 525-line, RGB (red-green-blue) color TV monitor, with 30 frame per second refresh, 2-to-1 interlace. It receives data from the video generator 6 via three video coaxial cables.

The program function keyboard 12 provides operator interactive inputs to the host processor, through the GDCU 8.

The trackball 14 is used by an operator to position the graphic cursor on the display screen. Moving the ball causes the cursor to move responsively on the color display, under control of the GDCu 8. The trackball 14 and the program function keyboard 12 interface with the GDCU 8 through the manual input adapter 32.

The graphic patch panel 24 is used to interconnect the 38 IDCs 16 with the 10 GDCUs 8, as shown in FIG. 8. It contains, on the input side, 176 connectors which receive the four output cables (3 video, 1 digital) from each of the video generators 6 in each GDCU (4 video generators per GDCU, 11 GDCUs, including spare). On the output side of this patch panel 24, 176 connectors are provided for the 39 IDCs 16 and to allow expansion capability for 5 additional IDCs.

Internally, the patch panel provides quick-release patch cables, for interconnection of any IDC 16 with any GDCU 8 channel.

Although the 3277 display stations 18 are not electrically a part of the color graphic display system, a separate stand along alphanumeric patch panel 26 is provided to allow the interconnection and reconfiguration functions to be performed. A 3277 18 requires only, 1 coaxial cable, therefore, the alphanumeric patch panel 26 provides 84 input connectors to accommodate 39-IBM 3277's housed in the IDC 16 and 45 additional stand-alone 3277s.

The GDCU 8 is a free standing unit which provides the necessary signals and controls to support four color graphic displays and associated operator devices. The GDCU 8 does not require operator attendance during operation.

Programmable Controller 4

The controller (PC) 4 is a 16-bit, general purpose, stored-program machine using two's complement arithmetic. Utilizing high-speed, high density, solid state logic, the machine can be considered a pluggable unit with the GDCU 8. The PC 4 also incorporates a high-speed monolithic memory 48, packaged so as to be modular in 8K-bytes increments up to 64K-bytes.

The functions to be performed by the PC 4 are: direct interface with the host processor, receipt and interpretation of graphic commands from the host, receipt, modification, and ordering of graphic data from the host, interface with, and control of, the refresh buffer 28 in display updates, deletions and changes, receipt, monitoring and transmission of manual inputs from the IDCs 16, maintenance of status and sense information for transmission to the host processor, and control of the graphic cursor for each display, in response to manual inputs from the IDC 16.

The PC 4 is interrupt driven, and communicates with attaching units by way of a 16-bit I/O bus 50, through appropriate adaters. Specific adapters incorporated within the PC 4 are a disk file adapter, a System/370 local channel adapter 52 and a display adapter 30.

The GDCU 8 incorporates a small, read/write disk file 54 which interfaces with the PC I/O bus 50 through the disk file adapter. Since the PC monolithic memory 48 is volatile, the PC control program will be resident on the disk file 54, to be load into the PC memory 48 during the initial program load (IPL).

Diagnostic programs and test patterns, for use during off-line diagnostic mode checkout of the DDTV system, are also resident on the disk 54.

The PC 4 incorporates a System/370 local channel adapter 52, to allow GDCU 8 communication with the host computer. This adapter presents an 8-bit, System/370 interface to the host, and a 16-bit interface to the PC 4.

The GDCU 8 will attach to the host processor via a block multiplex channel, and will support a burst mode data rate of up to 700K bytes per second across the interface.

The display adapter 30 permits the attachment of up to four independent video generator channels to the programmable controller 4. The adapter interfaces with 9 devices, four refresh buffers 28, four programmable symbol stores 56, and the manual input adapter 32. In addition, it receives control signals from the maintenance panel 34 and the sync generator.

Figure 10:
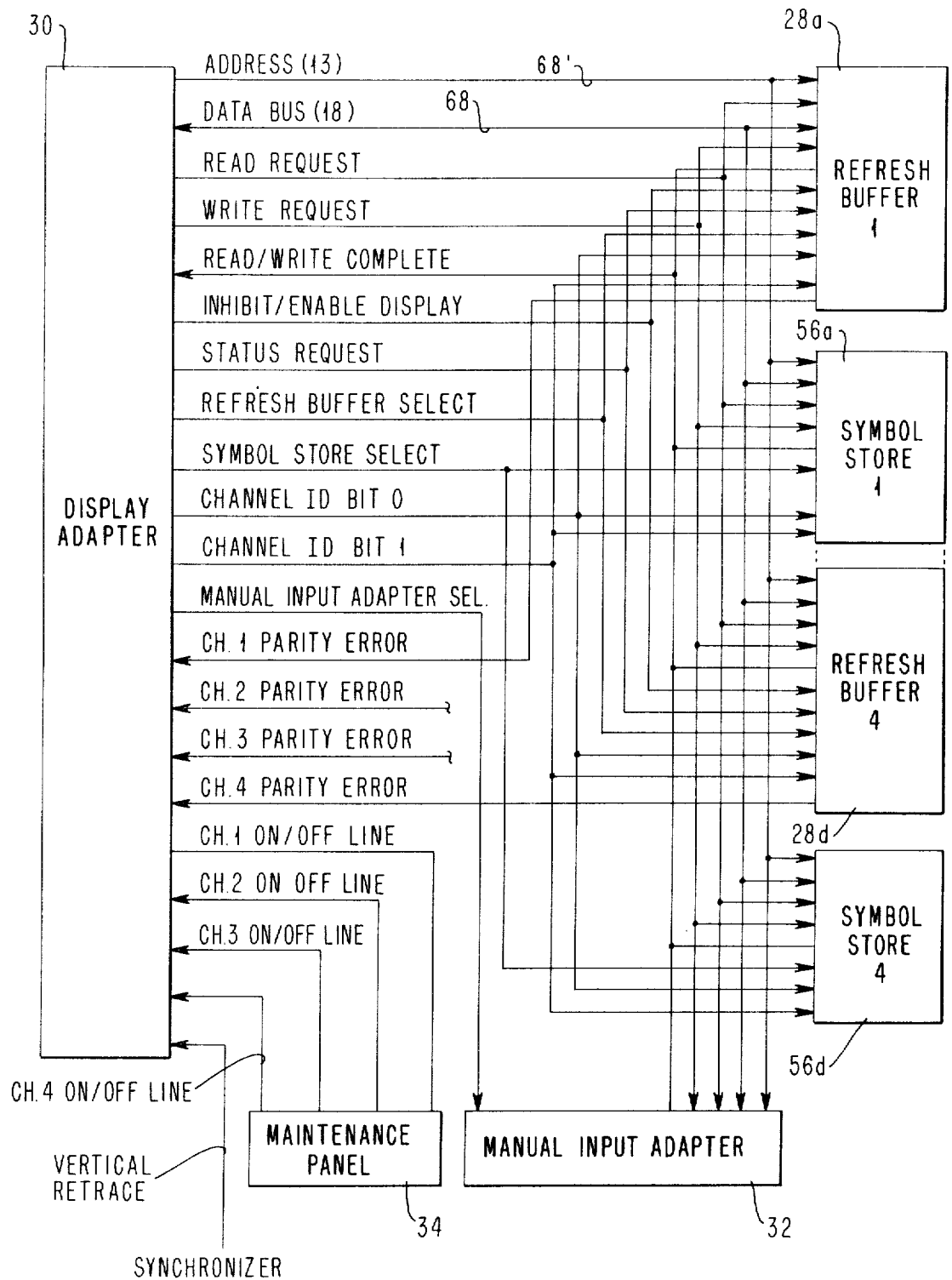
FIG. 10 shows a wiring diagram of the display adapter interface.

The interface shown in FIG. 10 consists of the following lines: Address-A thirteen bit address bus routed to all 9 devices. The programmable controller 4 has the ability to load the address and to specify incrementing by 0, 1, 2 or 4 after each read or write operation; Data Bus-An eighteen bit bi-directional bus used by all 9 devices. Sixteen bits are for data, two are parity bits; Manual Input Adapter Select-Selects the manual input adapter 32 for read or write operations; Symbol Store-Selects the symbol store 56 designated by the channel ID bits for read or write operations; Refresh Buffer-Selects the refresh buffer 28 designated by the channel ID bits for read or write operations; Channel ID Bits O and 1-Designates one of four symbol stores 56 or refresh buffers 28. Read Request-Initiates a read operation in the selected device at the address specified. The device selected places data on the data bus; Write Request-Initiates a write operation in the selected device at the address specified. The device uses the data on the data bus; Status Request- The device places status on the data bus; Read/Write Complete-The device has placed requested data or status on the data bus or has accepted the data to be written; Inhibit/Enable Display-If a "1", when a refresh buffer is selected that display is inhibited. If a "0" the display is enabled; Channel N Parity Error-Indicates a parity error has occurred while reading the refresh buffer 28. It is reset by a status request; Channel N On/Off Line-A signal from the maintenance panel 34 indicating a channel is on line or off line for diagnostics. The display adapter 30 interrupts the programmable controller 4 whenever a channel goes on or off line; and Vertical Retrace-A signal from the Sync generator, used by the display adapter 30 to cause once per frame interrupt to the programmable controller 4. This is used to initiate polling of the Manual input adapter 32.

DETAILED DESCRIPTION OF THE INVENTION

The refresh buffer 28 accepts data from the programmable controller 4 (PC) via the display adapter 30 and reads it out, ordered by Y-address, once per field to the intermediate buffer 38 for display. The stored data consists of combinations of vectors and symbols organized as background and dynamic data.

The refresh buffer 28 consists of a control module and two storage modules providing a total of 8K halfwords, each with sixteen data and two parity bits.

The major function of the refresh buffer 28 is to store the coded data for constructing the visual display. Data, which is received by the PC 4 in random fashion, is stored in a form ordered by Y-line. This allows the refresh buffer 28 to be read on a line-by-line basis.

Data is stored in the refresh buffer 28 in four halfword (16 bit each) slots, which are ordered by a method similar to indirect addressing. Each slot has a pointer field that contains the address of another slot; thus a group of slots can be threaded together into a list. FIG. 11 shows such a list. Slot 4 is the first in the list. It points to slot 7, which points to slot 2, and so on to slot 5, which is the last slot in the list. This is indicated by a special control bit designated end of thread (EOT). Lists such as this have a very useful property; slots can be added to the head of the list without disturbing any slots already in the list. In FIG. 12, slot 12 has been added to the head of the list. All that was necessary was to known that slot 4 was previously the head of the list. The PC organizes data in the refresh buffer into threaded lists, using separate lists for the background and dynamic data on each Y-line. The lists are accessed by an index that is a table of pointers. Every raster line has associated with it a pair of index halfwords: one for background data and one for dynamic data. They are stored in fixed memory locations in the refresh buffer at addresses which are a direct function of the Y-address of the data on the screen. When adding slot 12 to the list of FIG. 11, all that was necessary to access the index to find out that slot 4 was the previous head of the list, to write the 4 in the pointer field of slot 12, and to write 12 into the index so that it will point to the new head of the list.

Just as slot 12 was added to the list and became the slot at the head of the list, it is apparent that the slot at the head of the list can be readily removed. The index is read and used to access slot 12. The slot 12 pointer contains 4. This is loaded into the index and slot 12 is no longer in the list and could be threaded to another list. The PC uses this capability to manage empty slots. Empty slots are initially threaded together with a special pointer, called the next empty register (NER) pointer, pointing to the head of the list of empty slots. The NER is located in the PC 4, unlike the index which is in the refresh buffer 28. The NER can, however, be located within the refresh buffer 28. When a slot is needed for data, it is removed from the empty list and threaded to the proper Y-line list. When a data is cleared, the slot is rethreaded to the empty slots.

To read out for display refresh, the index halfword for the desired Y-line dynamic data is accessed, and from it the first slot in the list is entered. This data is used while the pointer field in the slot permits accessing the next slot. The last slot is recognized by its EOT bit, and the process is repeated for background data, after which data for the next Y-line is read.

The 8K halfwords or memory are divided into two groups, the index and the data slots. The index consists of 960 halfwords with the even numbered words pointing to the dynamic data and the odd numbered halfwords pointing to the background data. The remainder of the memory is organized into data slots of four halfwords each. Data slots start on double-word boundaries.

The refresh buffer 28 communicates with the PC 4 via the display adapter 30 described previously. Data words are transferred from the display adapter 30 to the refresh buffer 28 on a shared bi-directional halfword bus.

All update and diagnostic operations are accomplished by sequences of read and write commands from the display adapter 30. The PC 4 also has the capability of commanding that any display be inhibited. Whenever a refresh buffer 28 is selected it senses the inhibit-/enable line, and either inhibits or enables refresh according to its state. This capability permits one hundred percent of the refresh buffer time to be devoted to update the background data.

A complete display update can be accomplished in less than 42 milliseconds, worst/case, with the average update requiring less than 33 milliseconds (one frame time). During an update, the display would be inhibited.

The display adapter update formats, shown in FIG. 2 consist of the vector format, the symbol format, the index format and the empty slot format. The cursor is generated as a special symbol positioned by the PC 4 and indentified by the operator through its unique shape and color. As an alternative, two vectors could be used.

Vectors require a four halfword slot per vector. Symbols require a four halfword slot per set of up to four sequential symbols. Single symbols also require the same size slot, with space code for the last three symbols. The meaning of the fields is next discussed.

Refresh buffer data is stored in the refresh buffer 28 as received from the display adapter 30 in the following formats of FIG. 2.

The index format contains three fields. (1) Pointer- The eleven high order bits of the address of the first data slot to be read for display refresh; (2) End of Thread (EOT)-If "1", indicates no data present; (3) End of Display (EOD)-If "1", indicates last line of display.

The vector format has eleven fields. (1) Pointer- The eleven high order bits of the address of the next data slot to be read for display refresh; (2) Horizontal Line (HL)-If "1", indicates horizontal line; (3) Vector/Symbol (V/S)- A "1"indicates vector; (4) Flash (FL)-IF "1",the vector flashes at one Hz rate (0.5 seconds, 0.5 seconds off); (5) End of Thread (EOT)-If "1", indicates that no more data slots are to be read from this list for display refresh at that Y-address; (6) Slope-If HL="0", slope is sixteen bit inverse slope ($\Delta X/\Delta Y$). If HL="1", slope is the length of the line; (7) X-The X position of the start (top) of the vector or the left end of a horizontal line; (8) Color- Three bits to specify one of seven colors; (9) Shift-If "0",slope is interpreted as a six bit integer and 10 bit fraction. If "1",slope is interpreted as 10 bit integer and 6 bit fraction; (10) Sign-If "0", vector runs from left to right. If "1" vector runs from right to left. All vectors run from top to bottom; (11) ΔY-The difference between the starting and ending Y-line of the vector.

The symbol format has twelve fields. (1) Pointer-Same as a vector format; (2) Lower Order Space-See high order space; (3) High Order Space/Low Order Space-The high order space and the low order space fields determine the spacing (0–31 raster elements) between leading edges of the symbol defined by the slot; (4) Vector/Symbol (V/S)-A "0" indicates symbol; (5) Flash (FL)- Same as vector format; (6) End of Thread (EOT)-Same as vector format; (7) X-The X position of the left edge of the 16 by 16 array containing the first symbol; (8) Color-Same as vector format; (9–12) Symbols (S1–S4)-Eight bit codes used to specify symbols.

The empty slot format has two defined fields. (1) Pointer-The eleven high order bits of the address of the next slot in the list of empty slots; (2) End of Thread (EOT)-If "1", indicates that the slot is the last in the list of empty slots.

The interface with the intermediate buffer 32, shown in FIG. 13, consists of five control and sixteen data lines. Communication is initiated by the data request line. Data is then transferred on a demand/response basis, under control of the data present/data accepted lines. The request continue line is used during multiple transfers. An additional line, word one present, ensures that the intermediate buffer 38 and the refresh buffer 28 operate in address synchronism during multiple transfers. Data is transferred to the intermediate buffer 38 in the same formats in which it is stored in the refresh buffer 28, except that the 11-bit pointer field is replaced by a 9-bit Y-line field.

Refresh Buffer Operation: This section describes how read and write commands are used to initialize the refresh buffer 28, add data, delete data and erase background or dynamic data.

Initiation: Prior to operation, the refresh buffer 28 must be initialized. This is accomplished in two steps. First the index is preset by writing a halfword with EOT = "1" into each index location in the refresh buffer 28 except the last index location which is written with a halfword containing EOD = "1".

The data slots are then threaded by writing into the first word of each slot except the last, a halfword containing EOT = "0"and the eleven high order bits of the address of the first halfword of the next slot. The last slot is written with a halfword containing EOT = "1"and the PC loads the address of the first slot into its next empty register pointer (NER), completing the initialization of the refresh buffer 28. Initialization is facilited by having all write commands specify inhibit display.

In order to ensure that proper threading of the refresh buffer 28 is maintained, the refresh buffer 28 is not only initialized whenever the PC 4 does initial program load, but is also reinitialized whenever the entire display is erased.

Add Data: To add a vector or a string of up to four symbols, the PC 4 goes through the following steps: (1) Read background or dynamic index word, as required for Y-line to which data is to be addressed. (2) If EOT bit in NER = "0", read first halfword of slot pointed to by NER. If EOT = "1", all slots are full. (3) Using EOT bit and pointer from index word and data from host, assemble four halfwords and write slot of step 2. (4) Using pointer from NER (pointer to slot read), write pointer and EOT = "0"in index word of step 1. (5) Load EOT bit and pointer from halfword read in step 2 into NER.

This completes the data addition. The slot at the head of the list of empty slots has been selected and loaded and the NER now points to the next slot in the list. The index points to the newly written slot which now points to any previously written data.

Delete Data: To delete a data item, the PC 4 goes through the following steps: (1) Read background or dynamic index word, as required, for Y-line from which data item is to be deleted. (2) Using pointer from index, read data slot. If EOT = "1", PC reports "not found"to host and exits. (3) Compare slot contents with data to be deleted. (4a) If match, write EOT bit and pointer from slot in index and go to step 7. (4b) If no match and slot EOT = "1", report "not found" to host and exit. (4c) If no match and slot EOT =0, use pointer from slot to read next slot. (5) Compare slot contents with data to be deleted. (6a) If no match and EOT ="1", report "not found" and exit. (6b) If no match and EOT ="0", use pointer from slot to read next slot and go the step 5. (6c) If match, write EOT bit and pointer of matching slot in slot which pointed to matching slot. (7) Write EOT bit and pointer from NER into matching slot. (8) Load EOT = 0 and pointer to matching slot into NER.

This completes the data deletion. The data has been located and bridged around in its list or, if it was the only item in the list, the EOT in the index has been set to "1." The slot which contained the data has been added to the head of the list of empty slots.

Erase Dynamic Data: To delete all dynamic data, the PC 4 goes through the following steps: (1) Read first dynamic index halfword. (2a) If EOT = "1", go to step 7. (2b) If EOT = "0", use index pointer to read first halfword of data slot. (3a) If EOT = "1", go to step 4. (3b) If EOT = "0", use data slot pointer to read first halfword of next data slot. Repeat step 3. (4) Write NER into first halfword of last data slot. (5) Load EOT = "0" and pointer from index into NER. (6) Write EOT = "1" into index. (7a) If last dynamic index, exit. (7b) If not last dynamic index, read next dynamic index. (8) Go to step 2.

This completes the erasure. Each dynamic index halfword has had its EOT bit set to "1" and all lists of dynamic data have been threaded to the list of empty slots. If the command from the host was erase-add, the new data can now be added.

The refresh buffer 28, shown in FIG. 3, consists of 8K halfwords of memory, and addressing and control logic. It interfaces with the display adapter 30 and the intermediate buffer 38. Simultaneous requests for service are resolved by the priority control 60.

When the refresh buffer 28 is selected by the display adapter 30, and the priority control 60 permits, the control logic 62 gates the display adapter 30 address bus through the memory address register multiplexer 64 (MAR MUX) to the memory address register (MAR) 66 and initiates a read or write cycle as required. During write cycles, the display adapter data bus 68, which is the only data source for the refresh buffer 28, is loaded into the memory 70. During read cycles, the addressed memory location is loaded into the memory data register (MDR) 72 and gated onto the display adapter data bus 68. At the completion of the operation, the control logic 62 sets the read/write complete line, the display adapter 30 drops its request, and the control logic 62 drops read/write complete. The display adapter 30 then either drops its refresh buffer select line or changes the address and requests another memory operation.

When the intermediate buffer 38 requests data and the priority control 60 permits, reading of the refresh buffer 28 for display continues from where it left off. For convenience, assume that the first Y-line is about to be read.

The control logic 62 gates the refresh Y counter through the MAR MUX 64 into the MAR 66 and initiates a read cycle. When the index word is in the MDAR 72, the EOT and EOD bits are checked. If EOT = "1", there is no data, the refresh Y counter is incremented and operation repeated. When the last index word is read, the EOD bit is "1" and a status bit is set and the refresh Y counter reset for the next field.

When an index word with EOT = "0" is found, the pointer field from the MDR 72 is loaded into the 11 high order bits of the MAR 66 and "0"s are loaded into the two low order bits. The first word of a data slot is then read. The pointer field and EOT bit from this word are read into a temporary address register (TAR) 76.

Select gates replace the pointer with the Y-line number and the data present line to the intermediate buffer 38 is set. When the intermediate buffer 38 has taken the data, it sets data accepted and data present is dropped. The refresh buffer 28 does not wait, however, but increments the MAR 66, reads the second word, and sends it to the intermediate buffer 38 which will be able to accept it by the time it is available. This continues through the fourth word after which the EOT (in the TAR 76) from the first word is tested. If it is "1", the refresh Y counter is incremented and the next index word read; if it is "0", the TAR 76 is gated into the MAR 66 and the next data slot read.

Two status bits are provided. The first, which has already been discussed, is set at EOD and reset at vertical retrace. The second retains the display inhibit/ enable status from the most recent selection by the programmable controller 4.

The priority control 60 examines the status bits and requests service. The priority scheme is that the intermediate buffer 38 has top priority except when display is inhibited and during the period from EOD to vertical retrace. When the display adapter 30 has been granted service, however, it remains in control until its refresh buffer 28 select line drops.

Parity is checked with each memory read and parity errors reported to the display adapter 28. The PC 4 can request status of the refresh buffer 28, in which case error bits (one for each half of memory) and an inhibit/enable bit are gated onto the data bus 68.

An alternate embodiment of the refresh buffer 28 is disclosed in the U.S. Pat. No. 3,895,357 by A. A. Schwartz, et al., assigned to the instant assignee. Schwartz discloses the threaded queue buffer 200 in his FIG. 12 which can be employed as the refresh buffer 28 herein.

Intermediate Buffer Operation: The intermediate buffer 38 serves as a high-speed scratchpad memory for the vector 42 and symbol 40 generators. It consists of thirty-two 256 × 1 high-speed random access memory modules 20, a 32 bit input register 78, and the read and write addressing and control necessary for proper operation as shown in FIG. 4. The memory is divided into two equal areas, an active area and a preload area.

Data is initially written from the refresh buffer 28 into the preload area, sequentially by Y-line, until the preload area is full. As each TV raster line is generated into the PRAS 44, the data words for that line are read from the preload area into the appropriate symbol 40 or vector 42 generator. Reading from the preload area continues until the data for the Y-line being generated has been completely read out, or until the preload area becomes empty. Once a preload location has been read out, it is available for more data from the refresh buffer 28. Since the preload area contains 128 32 bit locations, no more than 64 vector crossings/4-symbol groups per line may be accomodated, since each vector/symbol group requires 64 bits, or two memory locations.

The active area contains the data which is being displayed at any given line time. The data is read each line, strobed into the appropriate vector 42 or symbol 40 generator, where it is modified and rewritten back into the active area. When the vector 42 or symbol 40 generators detect an end to the data, it is not written back. The active area is read and written, starting at the same address. The read address is constantly compared to the last address written on the previous Y-line. When a compare is made, it indicates that all of the data in the active area has been read and strobed into the vector 42 or symbol 40 generators. At this time, the preload area is tested for a Y-line compare and any data available is read from that area.

Normal Operation of Active Area: The active area is defined as the memory locations between the address 000 and 177 octal, inclusive. Vector/symbol data is loaded starting at 000 and counting up.

Figure 14:
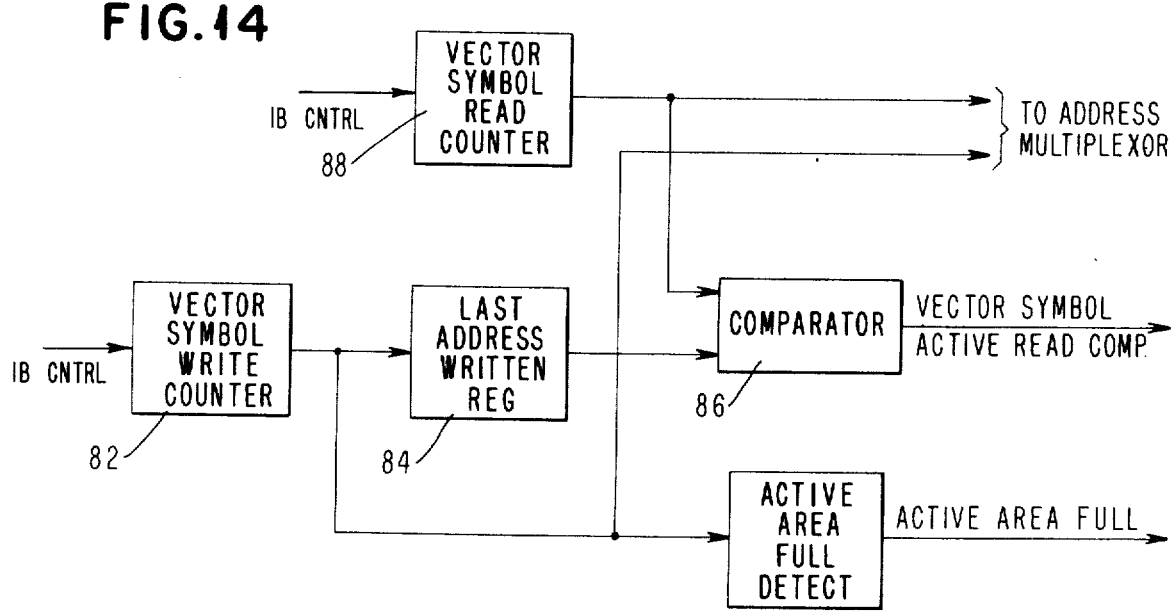
FIG. 14 is a block diagram of the addressing logic for the intermediate buffer.
Figure 15:
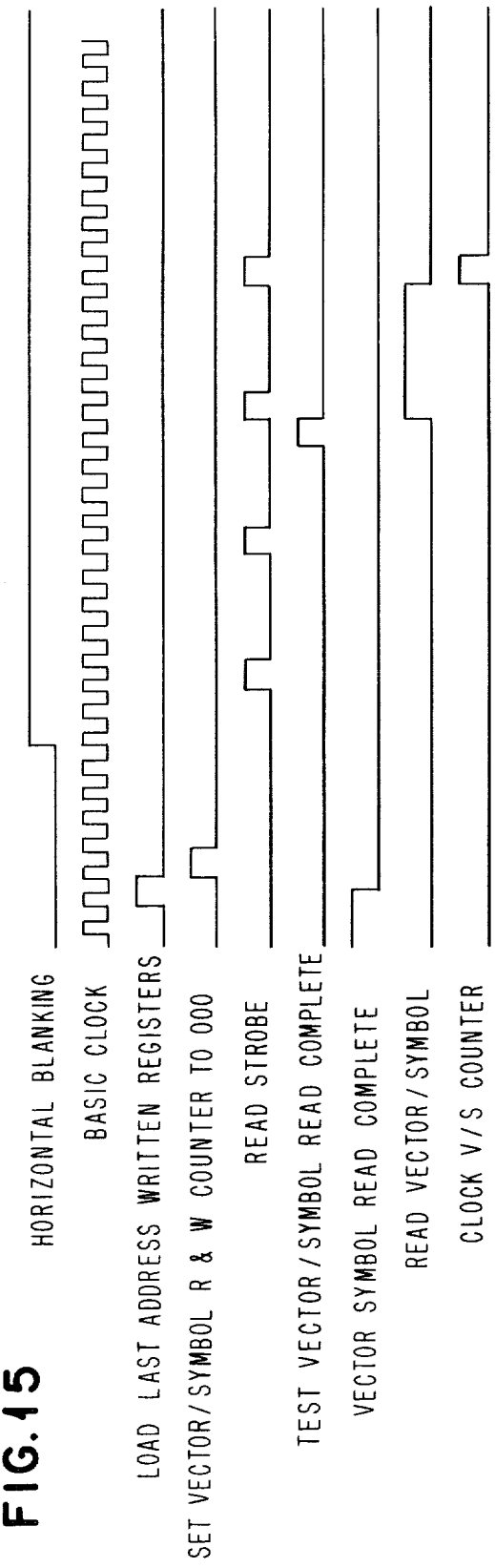
FIG. 15 shows an implementation of the timing for the intermediate buffer.

FIG. 14 is a block diagram of the addressing logic 92 and FIG. 15 shows an implementation of the timing. During horizontal blanking, the contents of the write counter 82 is strobed into the last address written register 84. The counter 82 is then reset to the starting value (000).

The vector/symbol read complete comparator 86 is tested; if this test is negative, a read cycle is initiated using the vector/symbol read counter 88 to address the MAR 80. The function code is tested and the data loaded into either the vector 42 or symbol 40 generator. The sample and read cycle is repeated until one of the following occurs:

1. A data present signal is received from the refresh buffer 28. This causes the read cycle in process to be completed. Control is then switched to the preload area, and the refresh buffer 28 data is loaded into the proper preload address.

2. A vector generator busy signal is received from the vector generator 42 and the word being read is a vector word. This causes the intermediate buffer 38 to wait until the vector generator 42 goes not busy or until conditions 1 or 4 occur.

3. A symbol generator busy signal is received from the symbol generator 40 and the word being read is a symbol word. This causes the intermediate buffer 38 to wait until the symbol generator 40 goes not busy or until conditions 1 or 4 occur.

4. A write request is received from the symbol 40 or vector 42 generator. This causes the symbol or vector data to be loaded into the input buffer register 78. The read cycle in progress is completed, and a write cycle is initiated using the vector/symbol write counter 82 as the address. This counter 82 is then incremented.

Blink Operation: The blink operation is performed at the input to the intermediate buffer 38. The sync and timing generator creates a blink signal which is a "1" for ½ second and "0" for ½ second. Whenever the blink signal is a "1", the blink control logic 90 is enabled to sample the data words from the refresh buffer 28. When a blink bit is detected the write cycle is ignored and the symbol or vector word associated with the blink bit is not loaded into the intermediate buffer 38. When the blink signal is a "0", the blink control is disabled and all words are loaded into the intermediate buffer 38.

Figure 16:
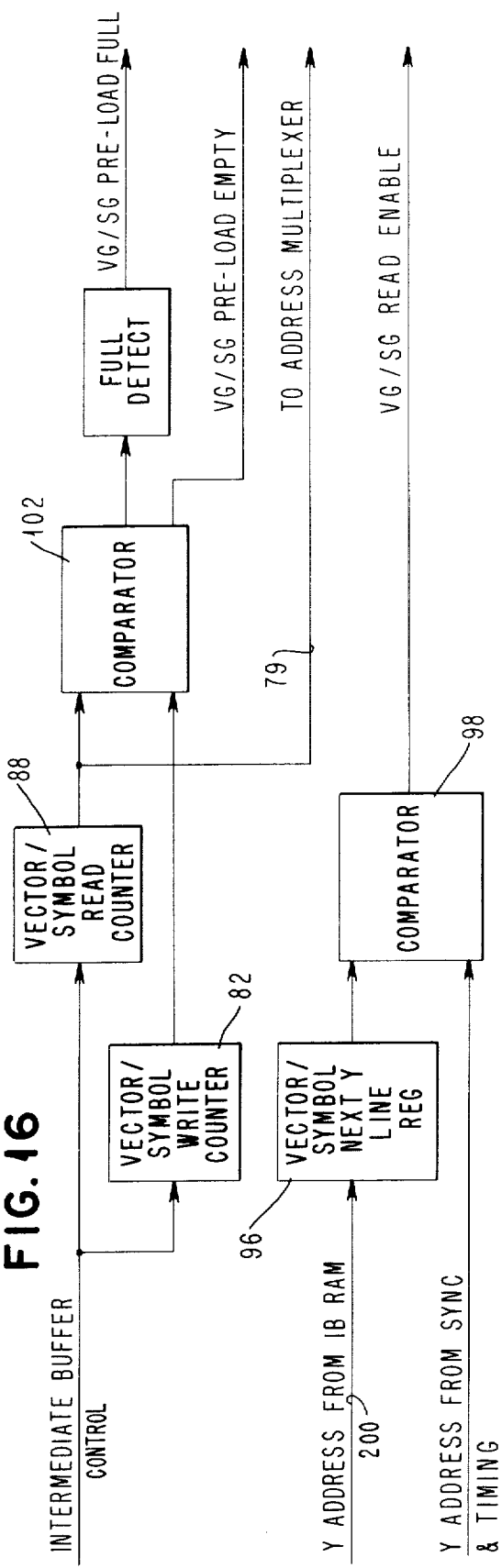
FIG. 16 shows the preload addressing logic 94.

Normal operation — Preload Area 94: The preload area is defined as the memory locations between addresses 200 and 377 octal. FIG. 16 is a diagram of the read and write address control required. The counters are the same as those in the active area except for the vector/symbol next Y-line registers 96 and comparators 98, 86 and 102.

Writing is initiated by the refresh buffer 28 with the data word being loaded into the appropriate address of the preload area. The Y-address of the first word written into each sector is loaded into the apropriate next Y-line register 96. As the active section becomes empty, the Y-line register is compared to the Y-address of the next line to be displayed (from the sync and timing generator 100). When a compare is made, a read cycle is initiated and the data is strobed into the appropriate generator 40, 42. The read counter 88 is incremented and another read initiated. The Y-address of this word is then loaded into the next Y-line register 96 and compared to the Y-address of the next Y-line. The procedure is continued until a Y-code is loaded which does not compare. At this time, the read counter 88 is not incremented and the read enable line is dropped until a compare is again detected.

The address counters 82 and 88 in the preload area are cyclic. When initialized, they are set to their minimum value. The write counter 82 is incremented after each write from the refresh buffer 28 until it reaches its maximum value. The next write causes it to be reset to minimum value. The read counter 88 operates in the same manner being incremented after each read operation. Thus the write counter 82 is always ahead of or equal to the read counter 88. Write operations from the refresh buffer 28 are continued until the preload area is full which occurs when the write counter 82 is so far ahead of the read counter 88 that one more write would cause data to be overwritten which had not yet been read. This is tested at the end of each write cycle when the write address counter 82 is incremented. It is compared to the read address counter 88, and when equal, the preload area full signal is enabled. No more write operations are initiated until at least one read operation has been completed.

Read operations are continued under control of the Y-compare circuitry 82, 88 and 102 until the preload area is empty, which occurs when the read counter 88 catches up to the write counter 82. This is tested at the end of each read cycle when the read counter 88 is incremented. It is compared to the write address counter 82, and when equal, the preload area empty signal is enabled. No more read operations are initiated until at least one write operation has been completed.

Data Initialization: The intermediate buffer 38 is initialized during each vertical blanking period by setting all of the counters 82 and 88 to their initial values. The refresh buffer write is then enabled and the preload area of memory 80 in IB 38 is filled with all of the data which is to start at the top of the screen loaded first. The Y-line compare circuitry 98 is enabled, and any data which begins at the top of the screen is read from the preload area of memory 80 in IB 38 and strobed via line 200 into the appropriate symbol 40 or vector 42 generators. A special control signal prevents the generators 40 or 42 from modifying the data, and it is simply written back, as received, into the active area of memory 80 in the IB 38 over line 207. The operation is continued until either the active area of memory 80 in IB 38 is filled or the Y-compare circuitry 98 output is low, indicating that there is no more data for that line address. When the vertical blanking period is over, the active read circuitry 88 is enabled and operation continues as normal.

The symbol generator 40 has a repertoire of 256 programmable symbols, each defined by a 16 by 16 matrix. Fonts this size or smaller can be directly accommodated. Larger fonts can be implemented by combining symbols.

Symbols are generated in groups of four. The symbol generator 40 locates symbols based on the X, Y address of the top left corner of the 16 by 16 matrix, accesses the symbol one segment at a time, and loads it into the PRAS 44.

The symbol words which are loaded into the refresh buffer 28 contain an X-address, an implicit Y-address, a color code (3 bits), and up to four symbol codes. Another bit is also provided to specify the blink attribute. When two, three, or four symbols are packed into one data word, the color and blink attributes apply to all.

Figure 17:
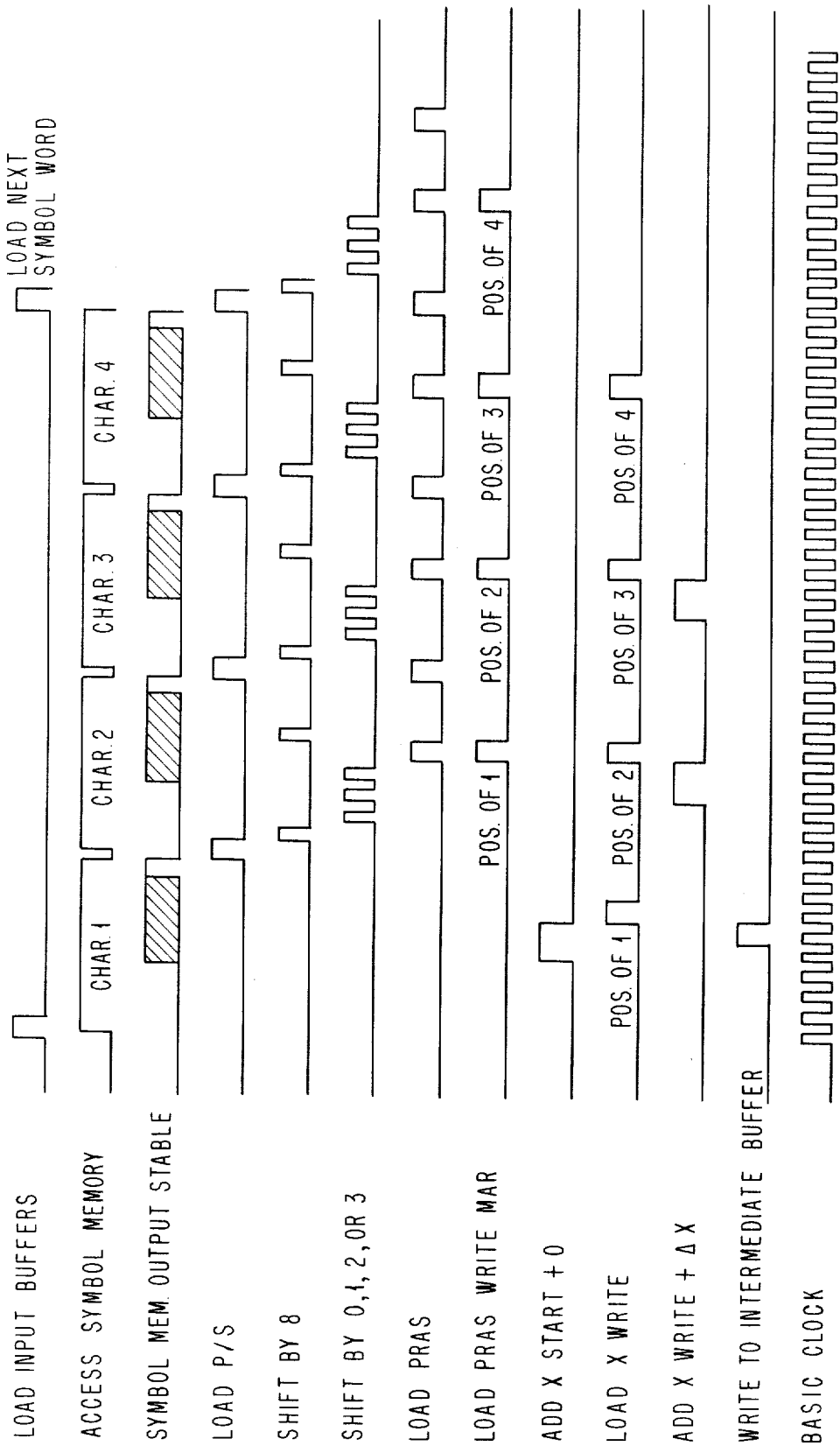
FIG. 17 is a timing diagram for sequential symbols.

FIG. 5 is a block diagram of the symbol generator and FIG. 17 presents a timing diagram for sequential symbols. The data, as read from the intermediate buffer 38, is in the following form:

32 Bits — 4 symbol codes
10 Bits — X position of leftmost bit of leftmost symbol
5 Bits — spacing
1 Bit — starting field
4 Bits — segment code
3 Bits — color These are loaded into the input registers 104, 106, 108, 110, 112 and 114 and the first symbol code is selected for input to the symbol memory 56.

The spacing is used to generate $\Delta X$, which is added to the X-write register 116 after each symbol generation, to provide inter-symbol spacing for sequential symbols. Up to four sequential symbols may be generated.

The segment code determines which line of the symbols is to be read from symbol storage 56 in symbol generator 40. It is incremented after each line and written back over line 202 into the intermediate buffer 38. When the segment word indicates that the symbol is complete, the symbol word is not rewritten.

Figure 18:
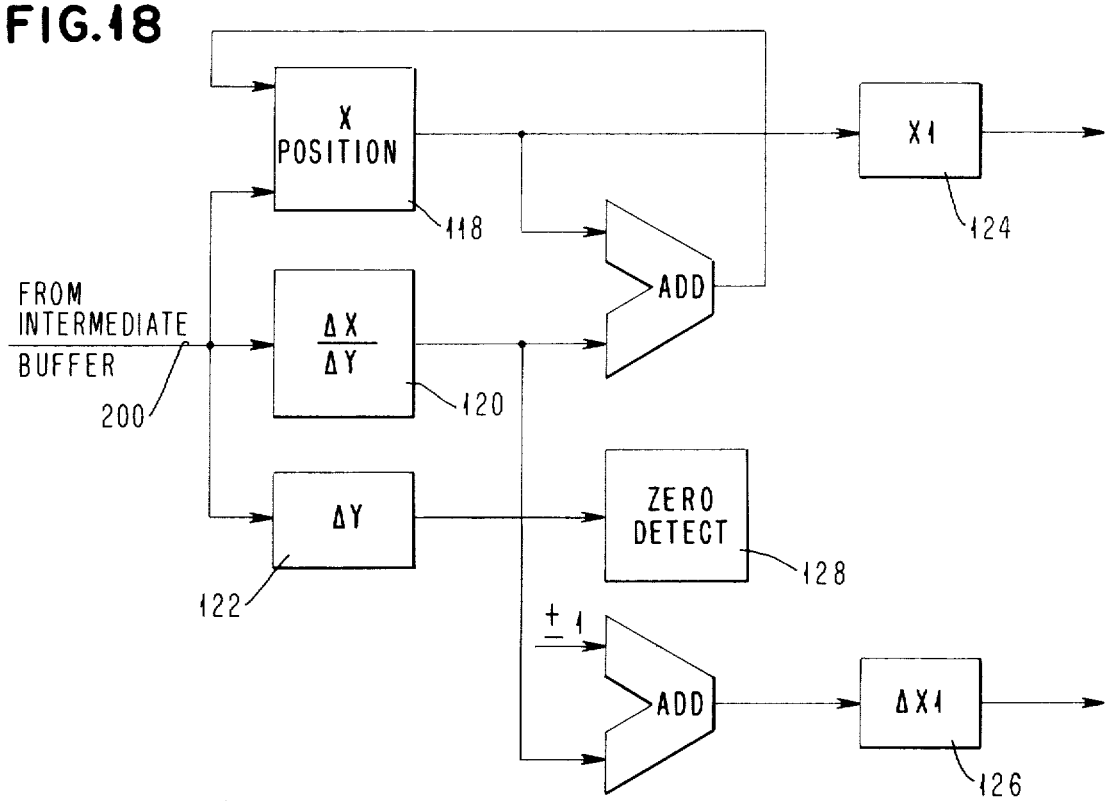
FIG. 18 is a simplified block diagram of the vector generator 42.

Data Format for Vector Generator: Vector data is transmitted by the host processor in the format shown in FIG. 2. Each vector has its own starting point (specified as the uppermost point on the vector), a length in the Y-direction $\Delta Y$) and an inverse slope ($\Delta X/\Delta Y$, in signed magnitude form). The vector generator 42 uses an algorithm whereby the length of a horizontal line segment is determined by the value of $\Delta X/\Delta Y$. Adding or subtracting this value to the starting X address gives the starting point for the next line segment. FIG. 18 is a simplified block diagram of this operation.

The starting X position, the value of ΔX/ΔY and the value of ΔY are received from the intermediate buffer 38 and loaded into the appropriate registers 118, 120 and 122 respectively. Two transfers are required to collect all the needed data. The X starting address for the first horizontal line segment is transferred to the X1 register 124. ΔX/ΔY is loaded into the ΔX1 register 126. The value of ΔY is decremented by two and if zero detect 128 determines it is not greater than or equal to zero, the values of X position ± 2 ΔX/ΔY, ΔX/ΔY and ΔY are written back into the intermediate buffer 38 over line 202 as the data needed to generate the next line segment of that field. When ΔY goes negative, the vector is completed and the data is not written back.

Figure 19:
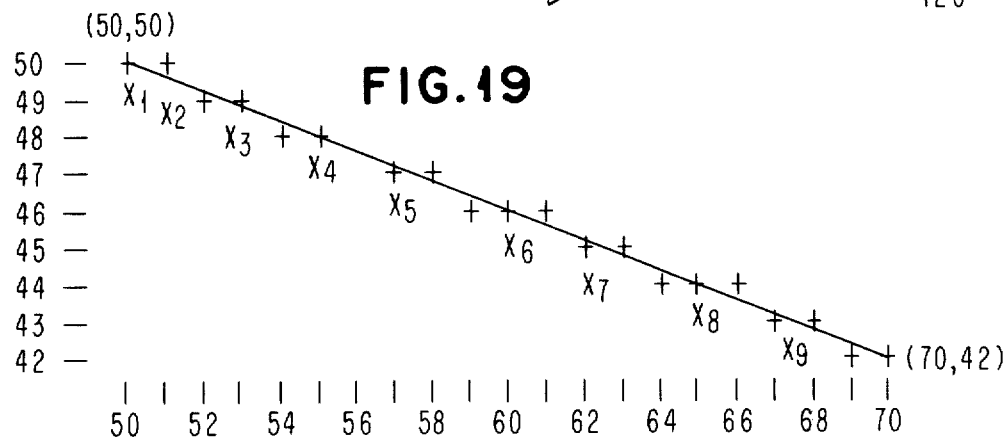
FIG. 19 is an example of the operation of the vector generator 42.

FIG. 19 shows an example of a vector drawn from coordinates X = 50, Y = 50 to coordinates X =70, Y = 42. In order to obtain the closest approximation to the actual vector, the first and last horizontal line segments are calculated by using ½ ΔX/ΔY as the addend. Thus on TV line 50 a horizontal vector is plotted from X = 50 to X = 51, on line 49 a horizontal vector is plotted from X = 52 to X = 53, on line 48 from X = 54 to X = 56, and so forth. The last segment is plotted from X = 69 to X = 70.

FIG. 6 is a detailed block diagram showing the data flow in the vector generator 42. X, ΔY and ΔX/ΔY are loaded into registers 118, 122 and 120 respectively, over line 200 from the intermediate buffer 38. ΔX/ΔY is a 16 -bit word with a shift control bit which determines whether the 16 -bits are to be added to the 16 most significant bits (MSB) or to the 16 least significant bits (LSB) of the 20 bit X-value. This shift bit, along with controls 132 which detect that it is the first or last horizontal segment to be generated, control the MUX shift logic 130 to align the value of ΔX/ΔY at the correct position in the ALU 134, 136. The shift bit equal to a "one" causes ΔX/ΔY to be added to the most significant bits of X (the most significant bits of ΔX/ΔY is added to the most significant bit of X) in ALU 136. If the segment to be generated is the first or last segment the value of ΔX/ΔY is shifted one bit right (the most significant bit of ΔX/ΔY is added to the next most significant bit of X in ALU 136).

Whenever the vector starts on the field opposite to that being displayed, an extra calculation is performed to generate the first segment. X1 register 138 gets loaded with the value of X received from the intermediate buffer 38 plus (or minus for positive slope vectors) ½ (ΔX/ΔY) + 1. FIG. 19 serves as an example. If line 49 is to be generated, the address register 119 is initially loaded with 50.

½ ΔX/ΔY = 1.25

Therefore X1 register 138 is loaded with 50 + 1.25 + 1 = 52

The value 52 is loaded into the X1 register 124 and the ten most significant bits of (ΔX/ΔY) − 1 are loaded into the ΔX1 register 126. For vectors with slopes ≥ 45°, the ΔX1 register 126 is reset to zero, causing a single element to be written on each raster line. For the first element of a positive vector <45°, (½) ΔX/ΔY is subtracted from the contents of the X address register 118. If the sum or difference of the 10 least significant bits of the X address register 118 and ΔX/ΔY in the 20 bit ALU 136 results in a carry to or borrow from the 10 most significant bits, then ΔX is just ΔX/ΔY.

ΔY is decremented by 2, and checked for sign. If it is non-negative, a new starting X address for X address register 118 must be determined. 2 ΔX/ΔY is added or subtracted from the value in X address register 118, as determined by the sign of the slope. This value, along with ΔX/ΔY and ΔY, is reloaded over line 202 into the intermediate buffer 38. A negative ΔY count means the vector is complete and the data is not written back into the intermediate buffer 38.

The eight most significant bits of the X1 register 124 are sent to the PRAS address register 144 in PRAS 44 and least significant bit pair 0 and 1 and bit pair 5 and 6 to the X shift control 146. The ΔX1 register 126 value is sent to the X length control 142 and zero detect 148. A major and a minor PRAS exist in PRAS 44 to receive four bits of vector data. For a transfer to the major PRAS each bit transferred represents 32 bits of data. Thus, in a four bit transfer to the major PRAS, 128 bits of data are actually transferred. To the minor PRAS, each bit transferred represents just one bit. In the case of a minor PRAS transfer, the two lowest significant bits of X1 are decoded through the X shift control 146 to provide a 4 bit word with ones in the bit positions corresponding to the starting X address. The ΔX1 value determines the number of ones to be written. For the first write to the minor PRAS, ΔX1 is compared with the two lowest significant bits of X1 to determine how many bits are being written. This number is subtracted from ΔX1 to determine the number of bits to go. Thereafter, writes of 4 bit words (all ones) are made to the PRAS 44 and the eight most significant bits of ΔX1 decremented until zero is detected. The two lowest significant bits of ΔX are then decoded to generate the number of "ones" that remain to be written. Thereafter, another 4 bit write to PRAS 44 is performed with only those bits set to 1, thus completing the vector generation.

For shallow angle vectors, it is desirable to cut down the number of 4 bit transfers to the minor PRAS by performing transfers to major PRAS. During vector generation, when a 32 bit X address boundary is reached, the five most significant bits of ΔX are checked; if not zero, the two lowest significant bits of these are directed into the X length control 142 and the corresponding bits of X are directed into the X shift control 146. The operation parallels that of a minor PRAS transfer. When zero is detected in the five most significant bits of X, the transfer mode is switched back to that of the minor PRAS to finish up the vector.

The PRAS 44 consists essentially of two one-line buffers 150 and 152 operating in an A-B arrangement. As one buffer is being read and displayed, the other is being loaded with the data for the next line. Data is loaded into PRAS 44 from the vector 42 and symbol 40 generators in 4 -bit words. The PRAS memories 150 and 152 are controlled so that only ones are written which allows an accumulation of data to occur. Thus, there are no restrictions on vector or symbol crossings since any number of data intersections may occur at a given point. As has been previously discussed, there are, in reality, two PRAS's: a major PRAS 20 -bit length with each bit representing a string of 32 bits on the display line and a minor PRAS representing a point-for-point image of the raster display line. The major PRAS is used only for vector generation.

Refresh Cycle Operation of the PRAS: The refresh cycle consists of a read cycle followed by an erase cycle. The erase is done to restore the line buffer 150 or 152 to an all-zero condition so that the next line of data can be loaded. FIG. 7 is a block diagram of the PRAS 44. A buffer-select flip flop 154 selects which of the line buffers 150 or 152 is to be in refresh. The address multiplexers 160 and 162 are then enabled to gate the read address counter 164 to the correct line buffer 150 or 152. The data lines are set to write zeros and the input data multiplexers 156 and 158 are set to allow a write enable pulse. The output multiplexer 166 is also set to enable reading from the correct buffer 150 or 152. FIG. 20 details the timing of the refresh cycle. As can be seen, the data is read into the parallel-to-serial converter 168 and then a write enable pulse is generated. The data lines are held at zero causing all bits to be reset. The output of the parallel-to-serial converter 168 is a serial digital video stream which contains the vector and symbol video. The output of the major and minor PRAS are ORed together, such that a 1 from the major PRAS will generate a serial stream of 32 "ones".

The line buffer 150 or 152 which is not in refresh is in a load cycle. When in this mode the data to be displayed on the next TV line is written. The input data and address multiplexers 156–162 are set up to select data from either the vector 42 or symbol 40 generator. The data to be written is strobed into the input register 170, and the address to be written is strobed into the write address counter 144. The line buffer data inputs are set to "1" since only "ones" are to be written. The data multiplexers 156, 158 select the output of the data register which is used to set the write enable inputs of the line buffer. In this way only the locations corresponding to a "1" in the data register receive write enable signals, and a zero in the data word will not erase a previously written "1". The input register 170 continues to be loaded and the write counter 144 incremented until the operation is completed. Since symbol and vector data are always loaded from left to right, the write address counter 144 need only be an up counter.

Video Output: Video output from the controller 8 to the console 16 is provided over three cables. The cables provide the red, green, and blue primary color signals to the TV monitor 10. One of these also contains synchronization information so that the color monitor may be properly synchronized.

Sync and Timing: The video waveform can conform to the specifications of EIA standard RS-170. This will provide a 30 Hz refresh, 2-to-1 interlaced raster. The 3.58 MHz color burst is not used. This is because the color signals are sent to the monitor on 3 separate lines representing the red, blue and green video signals, and not on a signal line in composite form as with a encoded color signal. The use of separate RGB signals provides higher bandwidth color (up to 7MHz) than is available with encoded color signals. FIG. 21a shows the sync generator block diagram and FIG. 21b the resulting raster. The total raster is shown including blank regions which are not visible. The numbers horizontally indicate bits per raster line and the numbers vertically indicate number of raster lines.

A base oscillator 172 or 11.97 MHz is used to generate the basic clocking signal bit rate along a raster line. Its divided by a 380 counter 174 from which are decoded 176 blanking, sync, equalizing, and vertical sync signals, all at twice the line rate (31,500). The 178 divided by 525 and 180 divide by 525 and 180 divide by 2 counters are decoded by decoder 302 and used to select these signals such that the even signals are selected for an even display field and the odd signals are selected for are odd display field to provide the horizontal sync and blanking output signals. Decoders 302 are also provided to select the equalizing and vertical sync pulses at the proper time to generate a composite waveform.

Thus it is seen that the video generator circuit invention stores graphic and alphanumeric display data so as to be more efficiently accessed for display than has been capable in the prior art, by cyclically storing the display data in a coded form which is sequentially modified as the raster field is generated.

While the PRAS 44 has been disclosed as storing two raster lines of video output data, the basic system can be modified to accommodate a PRAS with a storage of more raster lines. The number of raster lines to which data can be sorted in the refresh buffer could also be modified without departing from the spirit of the invention. The disclosure of the particular DDTV system in which the video generator circuit invention can be employed should not be construed as limiting the applicability of the invention to other display systems employing on-the-fly refresh techniques.

While the invention has been particularly shown and described with reference to preferred embodiments thereof, it will be understood by those skilled in the art that the foregoing and other changes in form and details may be made therein without departing from the spirit and the scope of the invention.

We claim:
1. A video generator circuit for converting randomly occurring data signals from a host processor, representing graphical patterns into a time sequential video signal for use with a sequentially line scanned display device, wherein the improvement comprises:
   an ordered refresh buffer connected to receive said data and adapted to sort said data signals into groups ordered by extremal scan line position for the pattern represented;
   an intermediate buffer having a first input connected to the output of said ordered refresh buffer for storing said ordered data signals once during each display field before the display of the pattern represented and outputting said ordered dat signals in synchronism with the line scan of the display;
   a graphical pattern generator connected to the output of said intermediate buffer for decoding said ordered data signals outputted from said intermediate buffer and generating on a first output line components of the pattern represented which lie along the display line to be scanned;
   a partial raster assembly storage connected to said first output line from said graphical pattern generator to store the components of the pattern represented which lie along the display line to be scanned;
   said graphical pattern generator modifiying said decoded ordered data signals to identify the horizontal coordinate for the intersection of said pattern represented with the next display line to be scanned, and outputting said modified data signal over a second output line to a second input line for storage in said intermediate buffer;
   said graphical pattern generator omitting the output of a modified data signal on said second output line when no components of said pattern will intersect succeeding display lines to be scanned in said field.
2. The video generator circuit of claim 1, wherein said refresh buffer further comprises:

a threaded memory means connected to said host processor for receiving said data signals and a raster line address value;

said data signals containing a data portion, a pointer portion, and an end of thread portion;

said memory means being divided into a pointer index memory and a data signal memory;

said index memory connected to a first input line for accepting raster line values outputted from said host processor, for storing queue pointer addresses at locations corresponding to the raster line value, said pointer addresses specifying the location in the data signal memory of the head of the corresponding thread of data signals;

said index memory connected to said data signal memory for accessing the head of the thread for the corresponding data signals stored therein;

said data signal memory having a second input line connected to said host processor for storing a sequence of data signals in a threaded queue corresponding to the raster line value input on said first input line;

said queue pointer addresses stored in said index memory being the location of the first data signal in the queue, each data signal in the queue containing in its pointer portion, the address of the next data signal in the queue, and the last data signal containing an end of thread indicium in its end of thread portion;

said data signal memory connected to an output data line for outputting data signals to said intermediate buffer in threaded queues of common raster line value;

an end of thread signal detector connected to said output line of said data signal memory;

said threaded queue of data signals being read out of said data memory until said end of thread signal detector detects a data signal containing an indication in the end of thread portion that no further data is contained in the data signal memory, corresponding to the raster line value input on said first input line.

3. A video generator circuit for converting randomly occurring data signals received from a host processor, wherein the refresh buffer of claim 2 further comprises:

a next empty register connected to said data signal memory means for storing the location of the head of the thread for the queue of empty registers in said data signal memory;

control means connected to said next empty register and said data signal memory for threading each emptied location in said data signal memory by means of storing its address in said next empty register as the next head of the thread of empty locations and by storing the address of the rest of the thread in said emptied location.

4. A video generator circuit for converting randomly occurring data signals received from a host processor, representing graphical patterns into a time sequential video signal for use with a sequentially line scan display device of claim 2, wherein said refresh buffer further comprises:

refresh counter means having a control input connected to said intermediate buffer and responsive to a data request by said intermediate buffer, for generating a raster line value to serve as an address for accessing a corresponding threaded queue of data signals from said memory means to be outputted to said intermediate buffer;

means for substituting said raster line value for the contents in said pointer portion of each of said data signals outputted by said memory means to said intermediate buffer.

5. The video generator circuit for converting randomly occurring data signals received from a host processor, representing graphical patterns into a time sequential video signal for use with a sequentially line scanned display device, claim 1, wherein said intermediate buffer further comprises:

a ramdom access memory for storing data signals;

said random access memory being divided into a preload memory and an active memory;

said preload memory having said first input connected to said refresh buffer and an output connected to the input of said graphical pattern generator, for storing said data signals when they are initially input to said intermediate buffer for the display of the pattern represented;

said active memory having said second input connected to said second output line of said graphical pattern generator and an output connected to the input of said graphical pattern generator, for storing said data signals modified by said graphical pattern generator to represent the portion of the pattern which remains to be displayed.

6. A video generator circuit for converting randomly occurring data signals received from a host processor, representing graphical patterns into a time sequential video signal for use with a sequentially line scanned display device, of claim 5, which further comprises:

a raster sync pulse generator for specifying the time at which each raster line is to be displayed;

and wherein said intermediate buffer further comprises:

a next Y-line register connected to said first input line to store the raster line value of the first data signal in the corresponding threaded queue of data signals input from said refresh buffer;

a first comparator having an input connected to said next Y-line register and an input connected to said raster sync pulse generator, to determine when data stored in said preload memory is to be outputted on said output line to said graphical pattern generator for display;

a read counter having a control input connected to said preload memory for counting the number of data signals read from said preload memory and outputted to said intermediate buffer;

a write counter having an input connected to said preload memory for counting the number of data signals written into said preload memory from said refresh buffer;

a second comparator having a first input connected to said read counter and a second input connected to said write counter for determining when said preload memory has attained its maximum storage capacity in storing data signals.

7. The video generator circuit for converting randomly occurring data signals received from a host processor, representing graphical patterns into time sequential video signals for use with a sequentially line scan display device of claim 6, wherein said intermediate buffer further comprises:

a last address written register having an input connected to said write counter for storing the number of data signals written into said active memory at the end of the last raster line scanned;

a third comparator having an input connected to said last address written register and said read counter to determine when all of the data signals in said active memory have been read and outputted to said graphical pattern generator;

a positive output from said third comparator causing said first comparator to determine whether additional data signals have been stored in the preload memory corresponding to the present raster line scanned.

8. A video generator circuit for converting randomly occurring data signals received from a host processor, representing graphical patterns into a time sequential video signal for use with a sequentially line scan display device, of claim 5 wherein the improvement further comprises:

a raster timing generator which generates a periodic pulse;

and wherein said intermediate buffer further comprises:

a blink generator means having an input connected to said timing generator and an input connected to said first input line for said intermediate buffer and a control output line connected to said random access memory;

said data signals input over said first input line containing a blink portion to indicate that the corresponding graphical pattern is to be periodically displayed in synchronism with the periodic pulse from said timing generator;

said blink generator detecting said blink portion of a data signal input over said first input line and outputting over said control output line a control signal to said random access memory to load said data signal therein if said periodic pulse is on and to omit the loading of said data signal if said periodic pulse is off.

9. A video generator circuit for converting randomly occurring data signals received from a host processor representing graphical patterns into a time sequential video signal for use with a sequentially line scanned display device, of claim 1 wherein said graphical pattern generator further comprises:

a symbol memory having an input connected to the output of said intermediate buffer for storing symbol patterns having n raster line components;

said data signals input from said intermediate buffer having a symbol data portion and a segment code portion;

said symbol data portion of said data signal accessing the corresponding symbol pattern stored in said symbol memory;

said segment code portion representing which one of said n raster line components of said symbol is to be displayed;

a segment counter having an input connected to said output of said intermediate buffer for receiving said segment code portion of said data signal, and an output connected to said symbol memory, to select which of said n raster line components is to be displayed for the symbol pattern designated by said symbol portion of said data signal;

said segment counter modifying the contents of said segment code portion of said data signal to designate the next one of said n raster line components which is to be displayed;

said symbol memory having an output connected to said partial raster assembly storage for outputting the pattern of said selected raster line component of said accessed symbol pattern;

said segment counter having an output connected to said second input of said intermediate buffer for outputting said modified segment code portion of said data signal to form a modified data signal for storage in said intermediate buffer.

10. A video generator circuit for converting randomly occurring data signals received from a host processor, representing graphical patterns into a time sequential video signal for use with a sequentially line scanned display device, of claim 9 wherein said graphical pattern generator further comprises:

said segment counter selecting a plurality of raster line components of said symbol pattern for display;

said segment counter modifying the contents of said segment code portion of said data signal to designate the next plurality of said raster line components to be displayed;

said symbol memory outputting said plurality of raster line component patterns to said partial raster assembly storage.

11. A video generator circuit for converting randomly occurring data signals received from a host processor, representing graphical patterns into a time sequential video signal for use with a sequentially line scan display device of claim 9, which further comprises:

a plurality of partial raster assembly storage units, each of which displays a separate primary color;

and said graphical pattern generator further comprising:

said data signal having a color portion designating in which of a plurality of colors the symbol is to be displayed;

a color switch means having an input connected to the output of said intermediate buffer for receiving said color portion of said data signal and switching the output of said symbol memory to the designated ones of said plurality of partial raster assembly storage units; whereby the symbol may be displayed in a selected color.

12. A video generator circuit for converting randomly occurring data signals received from a host processor, representing graphical patterns into a time sequential video signal for use with a sequentially line scanned display device of claim 9, wherein said graphical pattern generator further comprises:

a segment detector having an input connected to said segment counter, for detecting when said modified segment code portion indicates the last raster line component of said symbol has been accessed from said symbol memory;

said segment detector having a control output connected to said intermediate buffer to prevent a modified data signal from being input to said intermediate buffer over said second input line when the last raster line component of said symbol has been accessed from said symbol memory.

13. A video generator circuit for converting randomly occurring data signals received from a host processor, representing graphical patterns into a time sequential video signal for use with a sequentially line scanned displayed device of claim 9, which further comprises:

a plurality of partial raster assembly storage units, each of which displays a separate intensity;

and siad graphical pattern generator further comprises:

said data signal having a color portion designating in which of a plurality of intensities the symbol is to be displayed;

a color switch means having an input connected to the output of said intermediate buffer for receiving said color portion of said data signal and switching the output of said symbol memory to the designated one of said plurality of partial raster assembly storage units;

whereby a symbol may be displayed at a selected intensity.

14. A video generator circuit for converting randomly occurring data signals received from a host processor, representing graphical patterns into a time sequential video signal for use with a sequentially line scanned displayed device of claim 1, wherein said graphical pattern generator further comprises:

said graphical pattern generator generating a sequence of connected horizontal line segments on successive raster lines to simulate a vector to be displayed;

said data signal input from said intermediate buffer representing said vector with the abscissa of its origin represented by an X portion and its reciprocal slope represented by a reciprocal slope portion;

an X address register having an input connected to the output of said intermediate buffer for receiving said X portion of said data signals and having an output connected to said partial raster assembly storage for locating the abscissa of the origin of a first one of said horizontal line segments representing said vector;

a slope register having an input connected to the output of said intermediate buffer for receiving said reciprocal slope portion of said data signal;

an adder having an augend input connected to said X address register and an addend input connected to said slope register for outputting a sum representing the value of the abscissa of the origin of the next one of said horizontal line segment representing said vector on the next raster line;

said adder having an output line connected to said second input of said intermediate buffer for outputting said sum as a modified X portion of said data signal for storage in said intermediate buffer.

15. The video generator circuit for converting randomly occurring data signals received from a host processor, representing graphical patterns into a time sequential video signal for use with a sequentially line scanned display device of claim 14, wherein said graphical pattern generator further comprises:

said data signal input from said intermediate buffer having a raster line portion representing the number of raster lines upon which said vector will be displayed;

a raster line counter having an input connected to the output of said intermediate buffer for receiving said raster line portion of said data signal;

said raster line counter modifying the contents of said raster line portion of said data signal to designate the number of remaining raster lines upon which the remaining portion of the vector is to be displayed after said instant horizontal line segment is displayed;

said raster line counter having an output connected to said second input of said intermediate buffer for outputting said modified raster line portion of said data signal to form a modified data signal for storage in said intermediate buffer;

a zero detector having an input connected to the output of said raster line counter for detecting when said modified raster line portion equals zero indicating no further components of the vector to be displayed need be generated.

16. The video generator circuit for converting randomly occurring data signals received from a host processor, representing graphical patterns into a time sequential video signal for use with a sequentially line scanned display device of claim 14, wherein said graphical pattern generator further comprises:

a length register having an input connected to said slope register for storing numerical value representing the length of said horizontal line segment;

a length decoder means having an input connected to said length register and an output to said PRAS, for generating a sequence of raster display data representing said horizontal line segment.

17. The video generator circuit for converting randomly occurring data signals received from a host processor, representing graphical patterns into a time sequential video signal for use with a sequentially line scanned display device of claim 16, wherein said graphical pattern generator further comprises:

said raster display data generated by said length decoder means being output in a sequence of $n$ bit units to said PRAS;

said raster line being divided into units of $n$-bits in length with modulo $n=0$ boundries;

said length decoder means having an input connected to said X address register;

said length decoder means dividing the X address from said X address register, modulo $n$, leaving a remainder;

said length decoder means subtracting said remainder from $n$, leaving a difference;

said length decoder means comparing said difference with the length of said horizontal line segment from said length register;

said length decoder means outputting as a first unit of raster display data, a number of bits corresponding to said difference if said difference is less than said length or a number of bits corresponding to said length if said length is less than said difference;

said length decoder means outputting $n$-bits as a next unit of raster display data and subtracting the value of $n$ from said length, leaving a residual length until the value of said residual length is less than $n$;

said length decoder means dividing the sim of said X address and said length modulo $n$, leaving a second remainder;

said length decoder means outputting as a last unit of raster display data, a number of bits corresponding to said second remainder.

18. The video generator circuit for converting randomly occurring data signals received from a host processor, representing graphical patterns into a time sequential video signal for use with a sequentially line scanned device of claim 17, wherein said graphical pattern generator further comprises:

said raster line being divided into blocks of $m \times n$ - bits in length with modulo $m \times n = 0$ boundries;

said length decoder means dividing the X address from said X address register, modulo $m \times n$, leaving a third remainder;

said length decoder means subtracting said third remainder from said length leaving a second difference;

said length decoder means dividing said second difference modulo $n \times m$ leaving a quotient;

said length decoder outputting on a second output line to said PRAS, raster display data indicating the number of contiguous $m \times n$ bit blocks representing said horizontal line segment is equal to said quotient.

19. The video generator circuit for converting randomly occurring data signals received from a host processor, representing graphical patterns into a time sequential video signal for use with a sequentially line scanned display device of claim 1, which further comprises:

said partial raster assembly storage having a first line buffer and a second line buffer, which are alternately loaded with raster display data from said graphical pattern generator and are alternately read out for display.

20. A video generator circuit for converting randomly occurring data signals received from a host processor, representing graphical patterns into a time sequential video signal for use with a sequentially line scanned display device, wherein the improvement comprises:

a threaded buffer connected to receive said data and adapted to sort said data signals into groups ordered by extremal scan line positions for the pattern represented;

an intermediate buffer having a first input connected to the output of said threaded refresh buffer for storing said ordered data signals once during each display field before the display of the pattern represented and outputting said ordered data signals in synchronism with the line scan of the display;

a graphical pattern generator connected to the output of said intermediate buffer for decoding said ordered data signals outputted from said intermediate buffer and generating on a first output line components of the pattern represented which lie along the display line to be scanned;

a partial raster assembly storage connected to said first output line from said graphical pattern generator to store the components of the pattern represented which lie along the display line to be scanned;

said graphical pattern generator modifiying said decoded ordered data signals to identify the horizontal coordinate for the intersection of said pattern represented with the next display line to be scanned, and outputting said modified data signal over a second output line to a second input line for storage in said intermediate buffer;

said graphical pattern generator omitting the output of a modified data signal on said second output line when no components of said pattern will intersect succeeding display lines to be scanned in said field.

* * * * *